US010635558B2

(12) United States Patent
Wu et al.

(10) Patent No.: US 10,635,558 B2
(45) Date of Patent: Apr. 28, 2020

(54) CONTAINER MONITORING METHOD AND APPARATUS

(71) Applicant: HUAWEI TECHNOLOGIES CO., LTD., Shenzhen (CN)

(72) Inventors: Qixuan Wu, Shenzhen (CN); Lei Dai, Shenzhen (CN); Shanxi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 15/926,453

(22) Filed: Mar. 20, 2018

(65) Prior Publication Data

US 2018/0210801 A1    Jul. 26, 2018

Related U.S. Application Data

(63) Continuation of application No. PCT/CN2016/101689, filed on Oct. 10, 2016.

(30) Foreign Application Priority Data

Oct. 26, 2015    (CN) .......................... 2015 1 0704797

(51) Int. Cl.
*G06F 11/30* (2006.01)
*G06F 11/34* (2006.01)
(Continued)

(52) U.S. Cl.
CPC .......... *G06F 11/3006* (2013.01); *G06F 11/30* (2013.01); *G06F 11/3051* (2013.01);
(Continued)

(58) Field of Classification Search
CPC .. G06F 11/3006; G06F 11/30; G06F 11/3051; G06F 11/3055; G06F 11/3086;
(Continued)

(56) References Cited

U.S. PATENT DOCUMENTS 5,939,974 A * 8/1999 Heagle .................. G06Q 10/06
340/286.09
7,819,003 B2 * 10/2010 Breed ..................... B60C 11/24
73/290 V
(Continued)

FOREIGN PATENT DOCUMENTS

CN    102637023 A    8/2012
CN    104331353 A    2/2015
(Continued)

OTHER PUBLICATIONS

International Search Report dated Dec. 28, 2016 in corresponding PCT Application No. PCT/CN2016/101689 (2 pages) (2 pages English Translation).

(Continued)

*Primary Examiner* — Arvin Eskandarnia
(74) *Attorney, Agent, or Firm* — Conley Rose, P.C.

(57) ABSTRACT

A container monitoring method and apparatus, which are used for monitoring a plurality of monitored objects running on a physical machine. The type of plurality of monitored objects comprising at least one of a container, a process-in-container, or a thread-in-container. The physical machines comprising a primary monitor. The primary monitor receives monitoring information respectively reported by the multiple monitored objects. Monitoring information of monitored objects of a same type in the multiple monitored objects is reported by using a same channel. The primary monitor determines respective service statuses of the multiple monitored objects according to the monitoring information and unique identifiers. This can reduce resources consumed during monitoring in the prior art, and resolve a problem that a requirement for multidimensional monitoring on a container cannot be met due to high resource consumption.

21 Claims, 7 Drawing Sheets

(51) Int. Cl.
*H04L 12/26* (2006.01)
*H04L 29/06* (2006.01)

(52) U.S. Cl.
CPC ...... *G06F 11/3055* (2013.01); *G06F 11/3086* (2013.01); *G06F 11/3495* (2013.01); *H04L 43/08* (2013.01); *H04L 43/10* (2013.01); *H04L 65/80* (2013.01)

(58) Field of Classification Search
CPC ...... G06F 11/3495; H04L 43/08; H04L 43/10; H04L 65/80
See application file for complete search history.

(56) References Cited

U.S. PATENT DOCUMENTS

| | | | |
|---|---|---|---|
| 8,601,115 B2 | 12/2013 | Pope et al. | |
| 2005/0046567 A1* | 3/2005 | Mortenson | G06Q 10/047 340/539.13 |
| 2005/0076134 A1* | 4/2005 | Bialik | H04N 7/17336 709/230 |
| 2006/0253767 A1* | 11/2006 | Winarski | G06F 11/1088 714/755 |
| 2007/0030813 A1* | 2/2007 | Arrowood | H04L 67/22 370/241 |
| 2007/0185874 A1* | 8/2007 | Tofinetti | H04L 41/0893 |
| 2011/0320585 A1* | 12/2011 | Pope | G06F 11/3006 709/224 |
| 2012/0250833 A1* | 10/2012 | Smith | H04M 11/04 379/45 |
| 2013/0275814 A1* | 10/2013 | Nayak | G06F 11/3006 714/47.2 |
| 2014/0172944 A1* | 6/2014 | Newton | H04L 41/0893 709/202 |
| 2014/0173135 A1* | 6/2014 | Varney | H04L 41/0893 709/245 |
| 2015/0009517 A1 | 1/2015 | Shimizu et al. | |
| 2015/0095917 A1 | 4/2015 | Challenger et al. | |
| 2015/0371175 A1* | 12/2015 | Voona | G06Q 10/063114 705/7.15 |

FOREIGN PATENT DOCUMENTS

| | | |
|---|---|---|
| CN | 104915263 A | 9/2015 |
| CN | 104915285 A | 9/2015 |
| CN | 105389243 A | 3/2016 |
| WO | 2008141063 A2 | 11/2008 |
| WO | WO 2017/071460 A1 | 4/2017 |

OTHER PUBLICATIONS

International Search Report (Forms PCT/ISA/210, PCT/ISA/237, PCT/ISA/220); dated Dec. 28, 2016 in corresponding PCT Application No. PCT/CN2016/101689 (14 pages).
Chinese Office Action dated Aug. 14, 2017 in corresponding Chinese Patent Application No. 201510704797.8 (5 pages).
Extended European Search Report dated Oct. 17, 2018 in related European Patent Application No. 16858896.0 (9 pages).
Foreign Communication From a Counterpart Application, European Application No. 16858896.0, European Notice of Allowance dated Mar. 5, 2020, 7 pages.

\* cited by examiner

CONTAINER MONITORING METHOD AND APPARATUS

CROSS-REFERENCE TO RELATED APPLICATIONS

This application is a continuation of International Application No. PCT/CN2016/101689, filed on Oct. 10, 2016, which claims priority to Chinese Patent Application No. 201510704797.8, filed on Oct. 26, 2015. The disclosures of the aforementioned applications are hereby incorporated by reference in their entireties.

TECHNICAL FIELD

The present invention relates to the field of physical machines, and more specifically, to a container monitoring method and apparatus.

BACKGROUND

The container (Container) technology is a currently hot technology in cloud computing. It is a lightweight virtualization technology, where resources are isolated by means of process group management. Because containers have advantages such as easy deployment and fast startup, currently, many containers, such as Google App Engines (GAE), have been deployed in the Internet industry. Cloud computing providers such as Google and Redhat are all providing services based on the container technology. In recent years, a tendency to intensive container deployment has become more apparent. Hundreds of containers may be deployed on a physical machine, and more containers will be deployed with development of technologies. In most containers, a plurality of processes or threads is distributed.

To ensure reliability and serviceability (meaning that provision of a qualified service for an application in need can be ensured) of a container when the container runs, running statuses of the container and processes and threads in the container need to be monitored, to accurately learn of a problem occurring when the container runs, and resolve the problem by using a proper policy. The monitoring may specifically include monitoring the container, monitoring the processes in the container, and monitoring the threads in the container.

In the existing container monitoring method, because containers are deployed intensively and many processes and/or threads are distributed in the containers, to comprehensively monitor running statuses of the containers and the processes and threads in the containers, many resources need to be consumed, and performance of a physical machine is affected severely. Moreover, when the physical machine has a limited quantity of resources, a requirement for multidimensional monitoring on the containers cannot even be met.

SUMMARY

In view of this, embodiments of the present invention provide a container monitoring method and apparatus, to resolve a problem of excessively high resource overheads during container monitoring, to meet a requirement for multidimensional monitoring on a container deployed on a physical machine.

According to a first aspect, an embodiment of the present invention provides a container monitoring method, used to monitor multiple monitored objects running on a physical machine, where the multiple monitored objects include at least one of a container type, a process-in-container type, or a thread-in-container type, the physical machine includes a primary monitor, and the monitoring method includes: obtaining, by the primary monitor, monitoring information respectively reported by the multiple monitored objects, where monitoring information of monitored objects of a same type in the multiple monitored objects is reported by using a same channel, each of the multiple monitored objects has a unique identifier, monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report; and determining, by the primary monitor, respective service statuses of the multiple monitored objects according to the monitoring information of the multiple monitored objects and identifiers of the multiple monitored objects.

This container monitoring method can resolve a problem of excessively high resource overheads during container monitoring, and can meet a requirement for multidimensional monitoring on a container deployed on a physical machine.

When reported monitoring information includes heartbeat information, a service status of a monitored object includes a running status of the monitored object. When reported monitoring information includes a quality of service report, a service status of a monitored object includes quality of service of an application carried on the monitored object. Certainly, when reported monitoring information includes heartbeat information and a quality of service report, a service status of a monitored object includes a running status of the monitored object and quality of service of an application carried on the monitored object.

In a first possible implementation manner of the first aspect, the determining, by the primary monitor, respective service statuses of the multiple monitored objects according to the monitoring information of the multiple monitored Objects and identifiers of the multiple monitored objects includes: determining, by the primary monitor according to a correspondence between data zones in which the monitoring information of the multiple monitored objects is located and the identifiers of the multiple monitored objects, the respective service statuses of the multiple monitored objects reporting the monitoring information, where the data zones are data zones of the multiple monitored objects reporting the monitoring information, and the data zones include at least one of a heap type or a stack type.

It should be understood that, when an operating system runs, the identifiers are registered in a memory of the operating system. Specifically, the identifiers are registered in a kernel mode memory of the operating system.

It should be noted that, in the prior art, due to isolation between containers, the multiple monitored objects running in a user mode are limited in terms of information obtaining. The multiple monitored objects cannot learn their unique identifiers in the operating system, and cannot add the identifiers to the monitoring information to enable the primary monitor to distinguish identifies of monitoring information reporters. Therefore, in a prior-art solution, each monitored object is identified by using a channel in one-to-one correspondence with the monitored object. However, in the solution in this embodiment of the present invention, the primary monitor determines, according to a correspondence between data zones in which the reported monitoring information is located and attribute information (which is specifically the identifiers) of the multiple monitored objects that is stored in the memory, reporters reporting the monitoring information. Therefore, the multiple monitored objects can share a channel to report the monitoring information, and a resource is saved.

With reference to the first aspect or the first possible implementation manner of the first aspect, in a second possible implementation manner of the first aspect, the channel is a communication connection between files or processes.

With reference to the second implementation manner of the first aspect, in a third possible implementation manner, the channel is a Proc file system, and the obtaining, by the primary monitor, monitoring information respectively reported by the multiple monitored objects includes: obtaining, by the primary monitor, the respective monitoring information that is reported by the multiple monitored objects by using one or more files in the Proc file system, where monitored objects of a same type in the multiple monitored objects share a same file in the Proc file system for reporting the monitoring information.

With reference to the second implementation manner of the first aspect, in a fourth possible implementation manner, the channel is a device file, and the obtaining, by the primary monitor, monitoring information respectively reported by the multiple monitored objects includes: obtaining, by the primary monitor, the respective monitoring information that is reported by the multiple monitored objects by using one or more device files, where monitored objects of a same type in the multiple monitored objects share a same device file for reporting the monitoring information.

With reference to the second implementation manner of the first aspect, in a fifth possible implementation manner, the channel is a socket communication connection, and the obtaining, by the primary monitor, monitoring information respectively reported by the multiple monitored objects includes: obtaining, by the primary monitor, the respective monitoring information that is reported by the multiple monitored objects by using one or more socket communication connections, where monitored objects of a same type in the multiple monitored objects share a same socket communication connection address for reporting the monitoring information.

It should be noted that, specifically, the socket communication connection may be a Unix Domain socket communication connection.

With reference to the second implementation manner of the first aspect, in a sixth possible implementation manner, the channel is an inter-process communication IPC channel, the multiple monitored objects include at least one of a thread type or a process type, a container in which each of the multiple monitored objects is located includes a monitoring thread, and the obtaining, by the primary monitor, monitoring information respectively reported by the multiple monitored objects includes: obtaining, by the primary monitor, the monitoring information that is reported by the multiple monitored objects by using respective corresponding monitoring threads, where monitored objects of a same type in the multiple monitored objects share a same IPC channel for communication with the primary monitor to report the monitoring information.

With reference to any one of the first aspect to the sixth implementation manner of the first aspect, in a seventh possible implementation manner, the monitoring information is the heartbeat information, and the method further includes: determining, by the primary monitor, configuration information of the multiple monitored objects, where the configuration information of the multiple monitored objects includes identity information, heartbeat information reporting manners, and heartbeat periods of the multiple monitored objects, the identity information of the multiple monitored objects includes the identifiers of the multiple monitored objects, the heartbeat information reporting manners indicate types of the channels, and the heartbeat periods indicate time intervals for reporting heartbeat information by the monitored objects during normal running; and pushing, by the primary monitor, the respective heartbeat information reporting manners to the multiple monitored objects, where the multiple monitored objects are determined according to the identifiers in the identity information; correspondingly, the obtaining, by the primary monitor, monitoring information respectively reported by the multiple monitored objects includes: obtaining, by the primary monitor, heartbeat information respectively reported by the multiple monitored objects, where the heartbeat information is reported according to the respective corresponding heartbeat information reporting manners of the multiple monitored objects; and correspondingly, the determining, by the primary monitor, respective service statuses of the multiple monitored objects according to the monitoring information of the multiple monitored objects and identifiers of the multiple monitored objects includes: determining, by the primary monitor, respective running statuses of the multiple monitored objects according to the heartbeat periods and the heartbeat information of the multiple monitored objects.

In this implementation manner, the primary monitor determines the multiple monitored objects, information that needs to be reported, and reporting manners according to configuration information. Monitoring is performed in a more targeted way, and can be customized and modified according to a user requirement.

With reference to the seventh implementation manner of the first aspect, in an eighth possible implementation manner, the physical machine further includes a manager, and the method further includes: determining, by the primary monitor according to the handling policies for abnormal running, a handling action on a monitored object running abnormally in the multiple monitored objects and an associated monitored object, where a subordination relationship or a cooperation relationship exists between the associated monitored object and at least one of the monitored object running abnormally; and handling, by the manager, the monitored object running abnormally in the multiple monitored objects and the associated monitored object according to the handling action.

In the eighth implementation manner of the first aspect, the monitored object running abnormally and the associated monitored object are handled. Because running of a container, a process, and a thread is associated, handling the associated monitored object together can resolve a problem caused to the operating system due to abnormal running more thoroughly.

With reference to any one of the first aspect to the sixth implementation manner of the first aspect, in a ninth possible implementation manner, the monitoring information is the quality of service report, and the method further includes: determining, by the primary monitor, configuration information of the multiple monitored objects, where the configuration information of the multiple monitored objects includes identity information, quality of service report reporting manners, and quality of service requirements of the multiple monitored objects, the identity information of the multiple monitored objects includes the identifiers of the multiple monitored objects, the quality of service report reporting manners indicate types of the channels, and the quality of service requirements are used to determine whether QoS of applications carried on the multiple monitored objects is qualified; and pushing, by the primary monitor, the respective quality of service report reporting manners to the multiple monitored objects, where the multiple monitored objects are determined according to the identifiers in the identity information; correspondingly, the obtaining, by the primary monitor, monitoring information respectively reported by the multiple monitored objects includes: obtaining, by the primary monitor, quality of service reports respectively reported by the multiple monitored objects, where the quality of service reports are reported according to the respective corresponding quality of service report reporting manners of the multiple monitored objects; and correspondingly, the determining, by the primary monitor, respective service statuses of the multiple monitored objects according to the monitoring information of the multiple monitored objects and identifiers of the multiple monitored objects includes: determining, by the primary monitor according to the quality of service requirements and the quality of service reports of the multiple monitored objects, whether the quality of service of applications respectively carried on the multiple monitored objects is qualified.

In this implementation manner, the primary monitor determines the multiple monitored objects, information that needs to be reported, and reporting manners according to configuration information. Monitoring is performed in a more targeted way, and can be customized and modified according to a user requirement.

It should be understood that, the monitoring information may alternatively include the heartbeat information and the quality of service report. For an implementation manner in this case, refer to the sixth implementation manner of the first aspect to the ninth implementation manner of the first aspect.

With reference to the ninth implementation manner of the first aspect, in a tenth possible implementation manner, the physical machine further includes a manager, and the method further includes: determining, by the primary monitor according to the handling policies for non-qualified quality of service, a handling action on a monitored object whose quality of service is non-qualified in the multiple monitored objects and an associated monitored object, where a subordination relationship or a cooperation relationship exists between the associated monitored object and at least one of the monitored object whose quality of service is non-qualified; and handling, by the manager, the monitored object whose quality of service is non-qualified in the multiple monitored objects and the associated monitored object according to the handling action.

In the tenth implementation manner of the first aspect, the monitored object whose quality of service is non-qualified and the associated monitored object are handled. Because running of a container, a process, and a thread is usually associated in terms of application carrying, handling the associated monitored object together can resolve a problem caused to the operating system due to abnormal running more thoroughly.

With reference to any one of the first aspect to the sixth implementation manner of the first aspect, in an eleventh possible implementation manner, the physical machine further includes a sending module, and the method further includes: sending, by the sending module, a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitor according to the service statuses of the multiple monitored objects and handling policies for abnormal service statuses.

In the eleventh implementation manner, when a service status is abnormal, an application on a monitored object is re-deployed on another physical machine by the management server. Operations are performed more flexibly and globally.

With reference to any one of the first aspect to the eleventh implementation manner of the first aspect, in a twelfth possible implementation manner, the physical machine further includes a secondary monitor, and the method further includes: when the primary monitor fails to receive heartbeat information of the secondary monitor in a first configured duration, triggering, by the primary monitor, the secondary monitor to exit a running state so that the secondary monitor is restarted, where the heartbeat information of the secondary monitor indicates that the secondary monitor runs normally in a time period; and when the secondary monitor fails to receive heartbeat information of the primary monitor in a second configured duration, triggering, by the secondary monitor, the primary monitor to exit a running state, and taking over the monitored objects as a current primary monitor, where the physical machine on which the primary monitor is located restarts the primary monitor so that the primary monitor is used as a current secondary monitor, and the heartbeat information of the primary monitor indicates that the primary monitor runs normally in a time period.

In the twelfth implementation manner, monitoring on the primary monitor and exchange between the primary and secondary monitors are implemented. System stability is ensured when the method is executed.

According to a second aspect, an embodiment of the present invention provides a physical machine, where the physical machine includes a receiving module and a primary monitoring module, multiple monitored objects run on the physical machine, the receiving module is configured to provide a channel for reporting monitoring information by the multiple monitored objects, and the channel is used by the multiple monitored objects to report the monitoring information to the primary monitoring module; the primary monitoring module is configured to receive the monitoring information via the receiving module, where monitoring information of monitored objects of a same type in the multiple monitored objects is reported by using a same channel, the multiple monitored objects include at least one of a container type, a process-in-container type, or a thread-in-container type, each of the multiple monitored objects has a unique identifier, monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report; and the primary monitoring module is further configured to determine respective service statuses of the multiple monitored objects according to the monitoring information of the multiple monitored objects and identifiers of the multiple monitored objects.

The physical machine provided in this embodiment of the present invention according to the second aspect is an apparatus corresponding to the method provided according to the first aspect, can resolve a problem of excessively high resource overheads during container monitoring, and can meet a requirement for multidimensional monitoring on a container deployed on the physical machine.

Specific implementation manners of the physical machine in the second aspect may be further extended according to the implementation manners of the container monitoring method recorded in the first aspect. Therefore, for the implementation manners of the physical machine in the second aspect, refer to descriptions of the first to twelfth implementation manners recorded in the first aspect.

According to a third aspect, an embodiment of the present invention provides another physical machine, including a hardware layer and an operating system OS running above the hardware layer, where multiple monitored objects and a primary monitor run on the OS, the multiple monitored objects include at least one of a container type, a process-in-container type, or a thread-in-container type, and the primary monitor is configured to obtain monitoring information respectively reported by the multiple monitored objects, where monitoring information of monitored objects of a same type in the multiple monitored objects is reported by using a same channel, each of the multiple monitored objects has a unique identifier, monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report; and the primary monitor is further configured to determine respective service statuses of the multiple monitored objects according to the monitoring information of the multiple monitored objects and identifiers of the multiple monitored objects.

The physical machine provided in this embodiment of the present invention according to the third aspect is another apparatus corresponding to the method provided according to the first aspect, can resolve a problem of excessively high resource overheads during container monitoring, and can meet a requirement for multidimensional monitoring on a container deployed on the physical machine.

Specific implementation manners of the physical machine in the third aspect may be further extended according to the implementation manners of the container monitoring method recorded in the first aspect. Therefore, for the implementation manners of the physical machine in the third aspect, refer to descriptions of the first to twelfth implementation manners recorded in the first aspect.

According to a fourth aspect, an embodiment of the present invention provides another container monitoring method, used to monitor multiple monitored objects running on a physical machine, where the multiple monitored objects include at least one of a container type, a process-in-container type, or a thread-in-container type, the physical machine includes a primary monitor, and the monitoring method includes: determining, by the primary monitor, service statuses of the multiple monitored objects by detecting information about execution of instructions by the multiple monitored objects, where the instruction includes a specified address, and the service status includes at least one of a running status or quality of service.

Specifically, the instructions may be some specified functions. The primary monitor determines the service statuses of the multiple monitored objects according to call statuses of the specified functions. In the monitoring method, a monitored object does not need to report its status. In this way, programming work can be reduced, and a monitoring method in which a third-party application is used can also be supported. This can resolve a problem of excessively high resource overheads during container monitoring, and can meet a requirement for multidimensional monitoring on a container deployed on a physical machine.

In a first implementation manner of the fourth aspect, each of the multiple monitored objects has a unique identifier, and in the aspect of determining, by the primary monitor, service statuses of the multiple monitored objects by detecting information about execution of instructions by the multiple monitored objects, the primary monitor determines the respective service statuses of the multiple monitored objects according to a correspondence between data zones in which the execution information of the instructions is stored and identifiers of the multiple monitored objects, where the data zones are data zones of the multiple monitored objects reporting the monitoring information, and the data zones include at least one of a heap type or a stack type.

With reference to the fourth aspect or the first implementation manner of the fourth aspect, in a second implementation manner, the method further includes: determining, by the primary monitor, identity information of the multiple monitored objects and handling policies for abnormal running, where the identity information of the multiple monitored objects includes at least one of a subordination relationship or a cooperation relationship of the multiple monitored objects and the identifiers of the multiple monitored objects; determining, by the primary monitor, a handling action on a monitored object running abnormally and an associated monitored object according to the identity information and running statuses of multiple monitored objects and the handling policies for abnormal running, where a subordination relationship or a cooperation relationship exists between the associated monitored object and at least one of the monitored object running abnormally; and handling, by a manager, the monitored object running abnormally in the multiple monitored objects and the associated monitored object according to the handling action.

With reference to any one of the fourth aspect to the second implementation manner of the fourth aspect, in a third implementation manner, the method further includes: determining, by the primary monitor, identity information of the multiple monitored objects and handling policies for non-qualified quality of service, where the identity information of the multiple monitored objects includes at least one of a subordination relationship or a cooperation relationship of the multiple monitored objects and the identifiers of the multiple monitored objects; determining, by the primary monitor, a handling action on a monitored object whose quality of service is non-qualified and an associated monitored object according to the identity information and quality of service of multiple monitored objects and the handling policies for non-qualified quality of service, where a subordination relationship or a cooperation relationship exists between the associated monitored object and at least one of the monitored object whose quality of service is non-qualified; and handling, by the manager, the monitored object whose quality of service is non-qualified in the multiple monitored objects and the associated monitored object according to the handling action.

quality of service Olin the second and third implementation manners, the primary monitor determines the multiple monitored objects, information that needs to be reported, and reporting manners according to configuration information. Monitoring is performed in a more targeted way, and can be customized and modified according to a user requirement. In addition, the monitored object whose quality of service is non-qualified and the associated monitored object are handled. Because running of a container, a process, and a thread is usually associated in terms of application carrying, handling the associated monitored object together can resolve a problem caused to the operating system due to abnormal running more thoroughly.

It should be understood that, the monitoring information may alternatively include heartbeat information and a quality of service report. For an implementation manner in this case, refer to the third implementation manner of the fourth aspect.

With reference to any one of the fourth aspect to the third implementation manner of the fourth aspect, in a fourth possible implementation manner, the physical machine further includes a sending module, and the method further includes: sending, by the sending module, a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitor according to the service statuses of the multiple monitored objects and handling policies for abnormal service statuses.

In the fourth implementation manner, when a service status is abnormal, an application on a monitored object is re-deployed on another physical machine by the management server. Operations are performed more flexibly and globally.

With reference to any one of the fourth aspect to the fourth implementation manner of the fourth aspect, in a fifth possible implementation manner, the physical machine further includes a secondary monitor, and the method further includes: when the primary monitor fails to receive heartbeat information of the secondary monitor in a first configured duration, triggering, by the primary monitor, the secondary monitor to exit a running state so that the secondary monitor is restarted, where the heartbeat information of the secondary monitor indicates that the secondary monitor runs normally in a time period; and when the secondary monitor fails to receive heartbeat information of the primary monitor in a second configured duration, triggering, by the secondary monitor, the primary monitor to exit a running state, and taking over the monitored objects as a current primary monitor, where the physical machine on which the primary monitor is located restarts the primary monitor so that the primary monitor is used as a current secondary monitor, and the heartbeat information of the primary monitor indicates that the primary monitor runs normally in a time period.

In the fifth implementation manner, monitoring on the primary monitor and exchange between the primary and secondary monitors are implemented. System stability is ensured when the method is executed.

According to a fifth aspect, an embodiment of the present invention provides a physical machine, where the physical machine includes a primary monitoring module, multiple monitored objects run on the physical machine, and the primary monitoring module is configured to determine service statuses of the multiple monitored objects by detecting information about execution of instructions by the multiple monitored objects, where the instruction includes a specified address, and the service status includes at least one of a running status or quality of service.

The physical machine provided in this embodiment of the present invention according to the fifth aspect is an apparatus corresponding to the method provided according to the fourth aspect, can resolve a problem of excessively high resource overheads during container monitoring, and can meet a requirement for multidimensional monitoring on a container deployed on the physical machine. Specific implementation manners of the physical machine in the fifth aspect may be further extended according to the implementation manners of the container monitoring method recorded in the fourth aspect. Therefore, for the implementation manners of the physical machine in the fifth aspect, refer to descriptions of the first to sixth implementation manners recorded in the fourth aspect.

According to a sixth aspect, an embodiment of the present invention provides another physical machine including a hardware layer and an operating system OS running above the hardware layer, where multiple monitored objects and a primary monitor run on the OS, the multiple monitored objects include at least one of a container type, a process-in-container type, or a thread-in-container type, and the primary monitor is configured to determine service statuses of the multiple monitored objects by detecting information about execution of instructions by the multiple monitored objects, where the instruction includes a specified address, and the service status includes at least one of a running status or quality of service.

The physical machine provided in this embodiment of the present invention according to the sixth aspect is another apparatus corresponding to the method provided according to the fourth aspect, can resolve a problem of excessively high resource overheads during container monitoring, and can meet a requirement for multidimensional monitoring on a container deployed on the physical machine. Specific implementation manners of the physical machine in the sixth aspect may be further extended according to the implementation manners of the container monitoring method recorded in the fourth aspect. Therefore, for the implementation manners of the physical machine in the sixth aspect, refer to descriptions of the first to sixth implementation manners recorded in the fourth aspect. Compared with the prior art, the embodiments of the fourth to sixth aspects have the following beneficial effects:

The embodiments of the present invention provide a container monitoring method and apparatus. The monitoring method is applied to a physical machine. Multiple monitored objects run on the physical machine. The monitored objects include at least one of a container type, a process-in-container type, or a thread-in-container type. Each of the multiple monitored objects has a unique identifier. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to a current intensive container distribution scenario.

Compared with the prior art, the embodiments of the first to third aspects have the following beneficial effects:

The embodiments of the present invention provide a container monitoring method and apparatus. The monitoring method is applied to a physical machine. Multiple monitored objects run on the physical machine. The monitored objects include at least one of a container type, a process-in-container type, or a thread-in-container type. Each of the multiple monitored objects has a unique identifier. Service statuses of the multiple monitored objects are determined according to monitoring information reported by the multiple monitored objects. In this procedure, monitored objects of a same type report monitoring information by using a same channel. This reduces resources consumed during monitoring in the prior art, and resolves a problem in the prior art that a requirement for multidimensional monitoring on a container cannot be met because only coarse-grained monitoring can be performed on a container due to high resource consumption. The container may be monitored in multiple dimensions including the container, a process in the container, and a thread in the container, and such multidimensional monitoring is also applicable to an intensive container deployment scenario.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a container monitoring method and apparatus. The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A is located, both A and B exist, and only B is located. In addition, the character "/" in this specification generally indicates an "or" relationship between the associated objects.

Container (Container) virtualization is an operating system-level, fast, and highly efficient virtualization technology, whose principle is providing different system views for different running processes based on an operating system kernel. Container virtualization may be applied to authorization of access to a hardware resource, for example, a CPU or I/O (Input/Output, input/output) bandwidth, with security and efficiency ensured. An act in a container is invisible to a process in another container. A container may be applied to different types of operating systems, such as a Linux operating system, a Windows operating system, and some embedded systems. This is not limited in the embodiments of the present invention. The container may run on a virtual machine (Virtual Machine, VM), or directly run on a physical machine. This is not limited in the embodiments of the present invention. The physical machine is also referred to as a host, which is a physical computer having a hardware environment with respect to the virtual machine. In the Linux operating system, a container technology is implemented by using a group and namespace. For ease of description, specific content of the container monitoring method is described by using the Linux system as an example in the embodiments of the present invention.

Figure 1A:
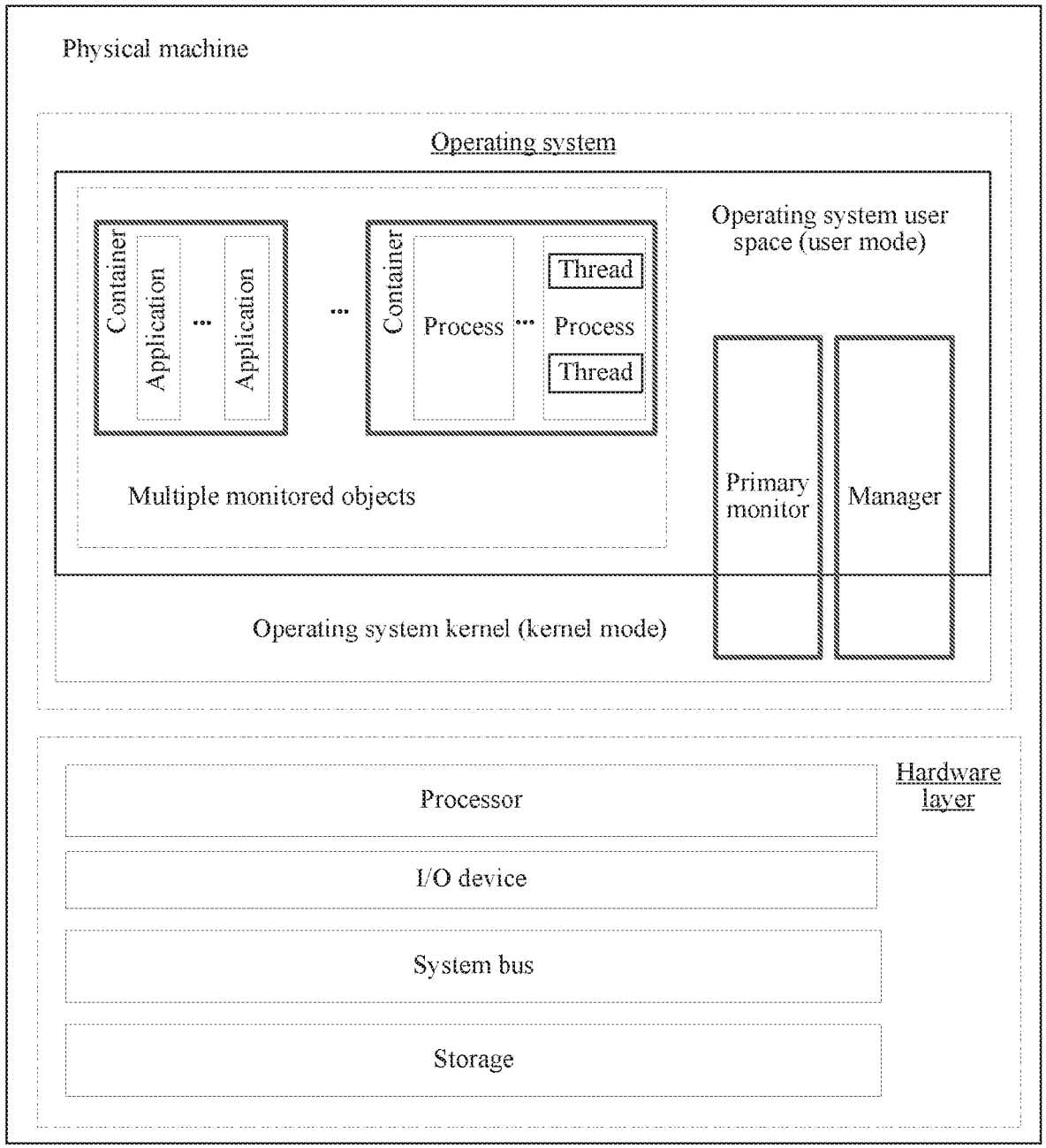
FIG. 1a is a schematic diagram of a system architecture according to an embodiment of the present invention.

FIG. 1a is a schematic diagram of a typical system architecture to which a container monitoring method according to an embodiment of the present invention is applicable. The system architecture may be understood as a physical machine, and the physical machine may be a single machine or a network element in a network. The system architecture includes: an operating system and a hardware layer.

The operating system may be divided into an operating system user space (user mode) and an operating system kernel (kernel mode).

In the embodiments of the present invention, multiple monitored objects all run in the user mode. The multiple monitored objects include at least one of a container type, a process-in-container type, or a thread-in-container type. For example, FIG. 1a shows multiple containers as examples, the multiple containers may include one or more processes, and the multiple processes may include one or more threads. It should be noted that, applications (Application, App) run on the containers shown in FIG. 1a. Persons skilled in the art should be aware that, the applications on the containers are all carried on processes and/or threads in the containers. The applications mean applications to users. However, to processing logic of a computer, running and management of the applications are both implemented by using the processes and/or threads.

A primary monitor is a module having a monitoring capability, and may be divided into a user mode part and a kernel mode part. The user mode part runs on the operating system user mode, and the kernel mode part runs on the operating system kernel mode. Further, as shown in FIG. 1a, the operating system further includes a manager. The manager is a module configured to process a monitored object whose quality of service status is abnormal, and may also be divided into a user mode part and a kernel mode part (mainly a kernel mode). The user mode part runs on the operating system user mode, and the kernel mode part runs on the operating system kernel mode. For further descriptions of the primary monitor and the manager, refer to the following description, including related content of FIG. 1b. The hardware layer includes a processor, a storage, a bus, and an I/O device (input/output device). The upper-layer operating system completes various tasks by invoking resources of the hardware layer. Specifically, if the physical machine is the network element in the network, one or more physical machines (such as application servers) may constitute a service environment, and one or more containers providing a service for an application run in the service environment.

Figure 1B:
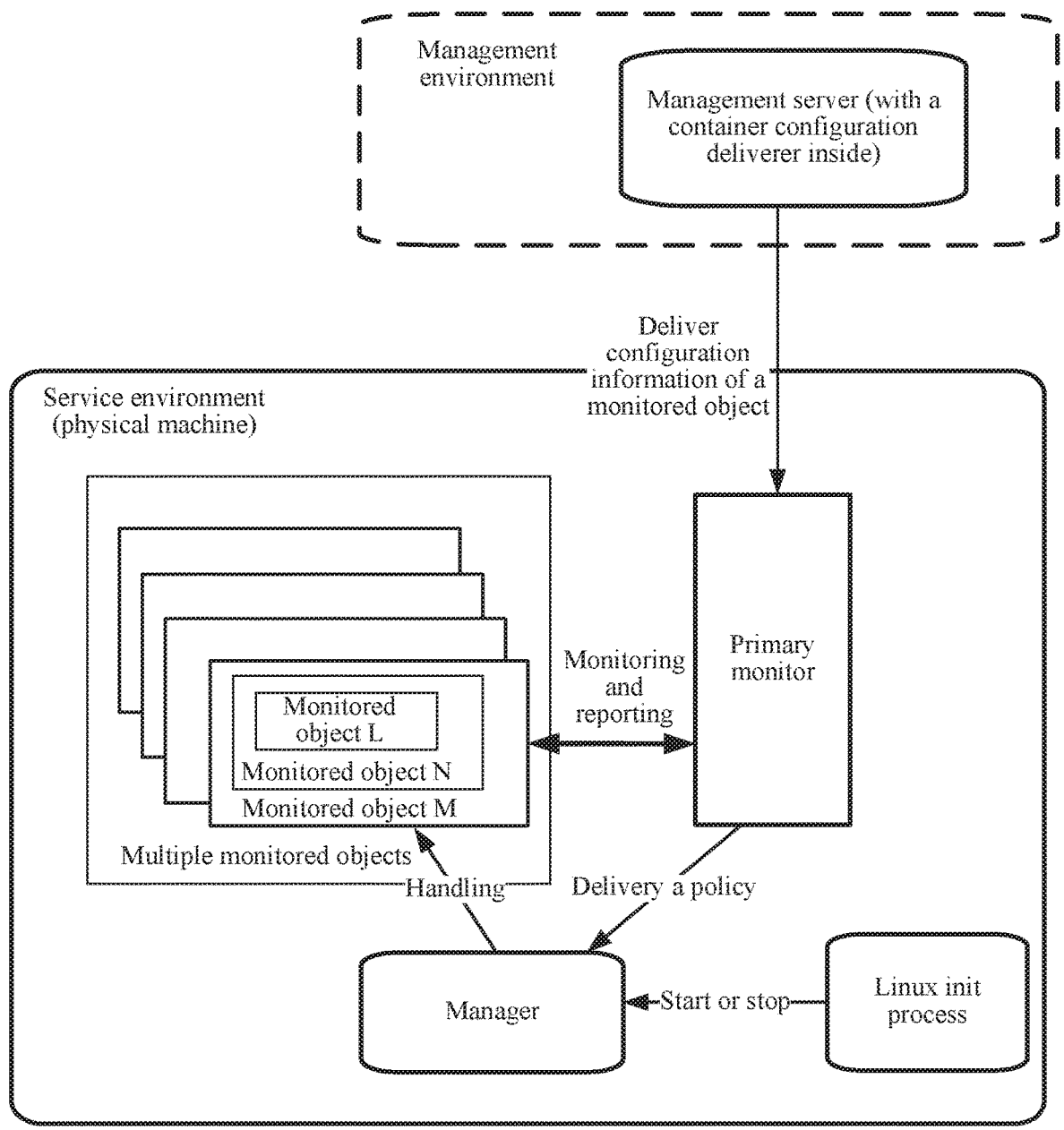
FIG. 1b is a schematic diagram of a logical architecture according to an embodiment of the present invention.

The following further describes, with reference to FIG. 1b, parts running on the operating system and related to this embodiment of the present invention. A service environment shown in a logical architectural diagram of FIG. 1b is specifically an application server. For an integral architecture of the application server, refer to FIG. 1a. Multiple containers run in an operating system of the application server. It should be understood that, FIG. 1b uses a Linux operating system as an example, but the operating system is not limited in this embodiment of the present invention. For example, in the Linux operating system, a manager is usually started by using a Linux init process (running on the operating system). The manager may be Docker (an opensource container engine), a thread, or a process, and is configured to perform any one of operations such as creating, ending, restarting, or re-allocating a container, or creating a process in a container. The Linux init process (generally referred to as an init process) is configured to initialize the system, or detect whether a sub process or a service started by the init process exits. The primary monitor may be configured to monitor a service status of a monitored object (which may be any one of a container, a process in a container, a thread in a container, or the manager), and may further determine a corresponding handling action according to the service status of the monitored object. Therefore, the manager may further operate the corresponding monitored object according to the handling action. It should be noted that, the primary monitor in this embodiment of the present invention is a monitor, a "monitor" mentioned below refers to the "primary monitor" unless otherwise stated, and the monitor is named the primary monitor to distinguish from a possible secondary monitor configured to monitor a running status of the primary monitor. For example, the primary monitor may be a thread or a process. In addition, one physical machine may have multiple modules performing a primary monitor function, the modules may communicate with each other, and the modules separately manage different groups of containers. It should be noted that, actually, the manager and the monitor may be independent modules, or may be in a relationship as a module and a sub module (for example, one or more monitors are embedded in one manager), or may be one module, that is, the module has functions of both the manager and the monitor. Specific forms of the manager and the monitor and a correspondence between them are not limited in this embodiment of the present invention. The correspondence may be a one-to-one, multiple-to-one, or even one-to-multiple or multiple-to-multiple correspondence. For example, one monitor delivers a handling policy to one manager, or multiple monitors deliver handling policies to one manager. However, in a general scenario, for the sake of resource saving, one physical machine usually needs one manager (that is, one thread or process). In this embodiment of the present invention, an example in which the manager and the primary monitor are independent threads (that is, the manager and the primary monitor are two independent modules) is used for description. In some scenarios of this embodiment of the present invention, at least one physical machine has two monitors and one manager, and the two monitors are separately a primary monitor and a secondary monitor and may deliver handling policies to the manager.

During actual networking, there are usually multiple application servers (physical machines), one or more of the multiple application servers may further have a container configuration deliverer (running on the operating system), configured to deliver configuration information of a monitored object to the primary monitor so that the primary monitor determines a service status of the monitored object and a handling policy for the monitored object. Optionally, the container configuration deliverer may further update and modify the configuration information according to feedback information of the primary monitor. The delivered configuration information may be input by a user, customized by a user server in advance, or obtained from another network element (for example, another application server or a management server in the network). This is not limited in this embodiment of the present invention. In another aspect, the container configuration deliverer may alternatively be disposed in a network management environment. The management environment refers to another network element configured to allocate a network resource other than the multiple application servers, such as the management server (which may be specifically a network management system or the like). That is, configuration information of a monitored object is delivered from the management environment to the service environment, so that the service environment monitors the monitored object according to the configuration information. This is not limited in this embodiment of the present invention. In another aspect, optionally, the service environment may report feedback information to the management environment, so that the management environment updates and modifies the configuration information according to the feedback information. It should be noted that, system architectural diagrams of FIG. 1a and FIG. 1b are merely intended for explanation and description, and this embodiment of the present invention is not limited thereto.

Figure 2:
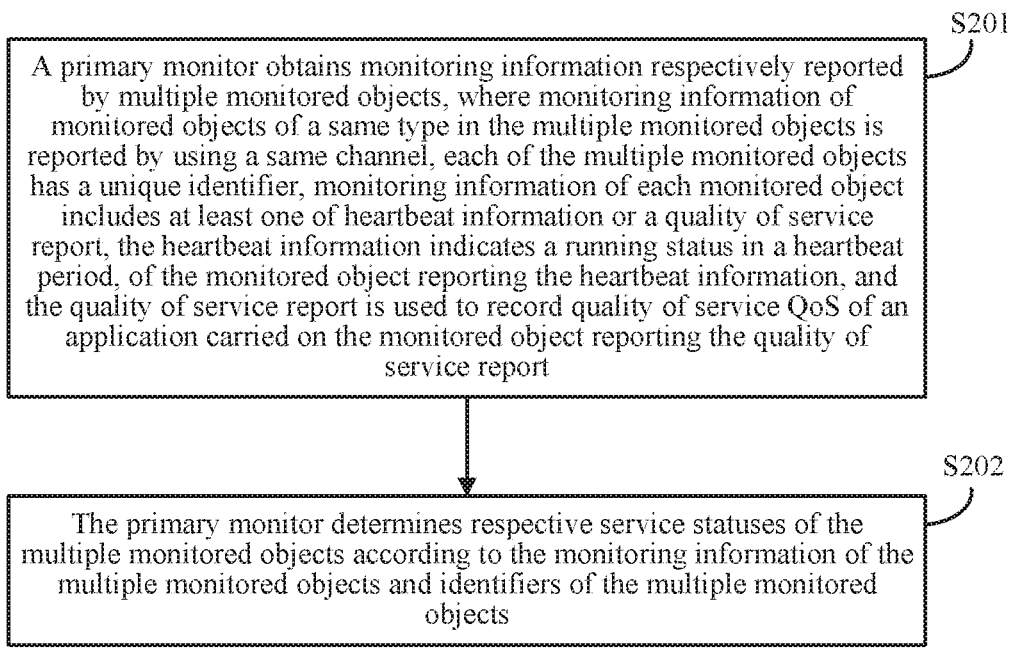
FIG. 2 is a schematic flowchart of a container monitoring method according to an embodiment of the present invention.
Figure 3:
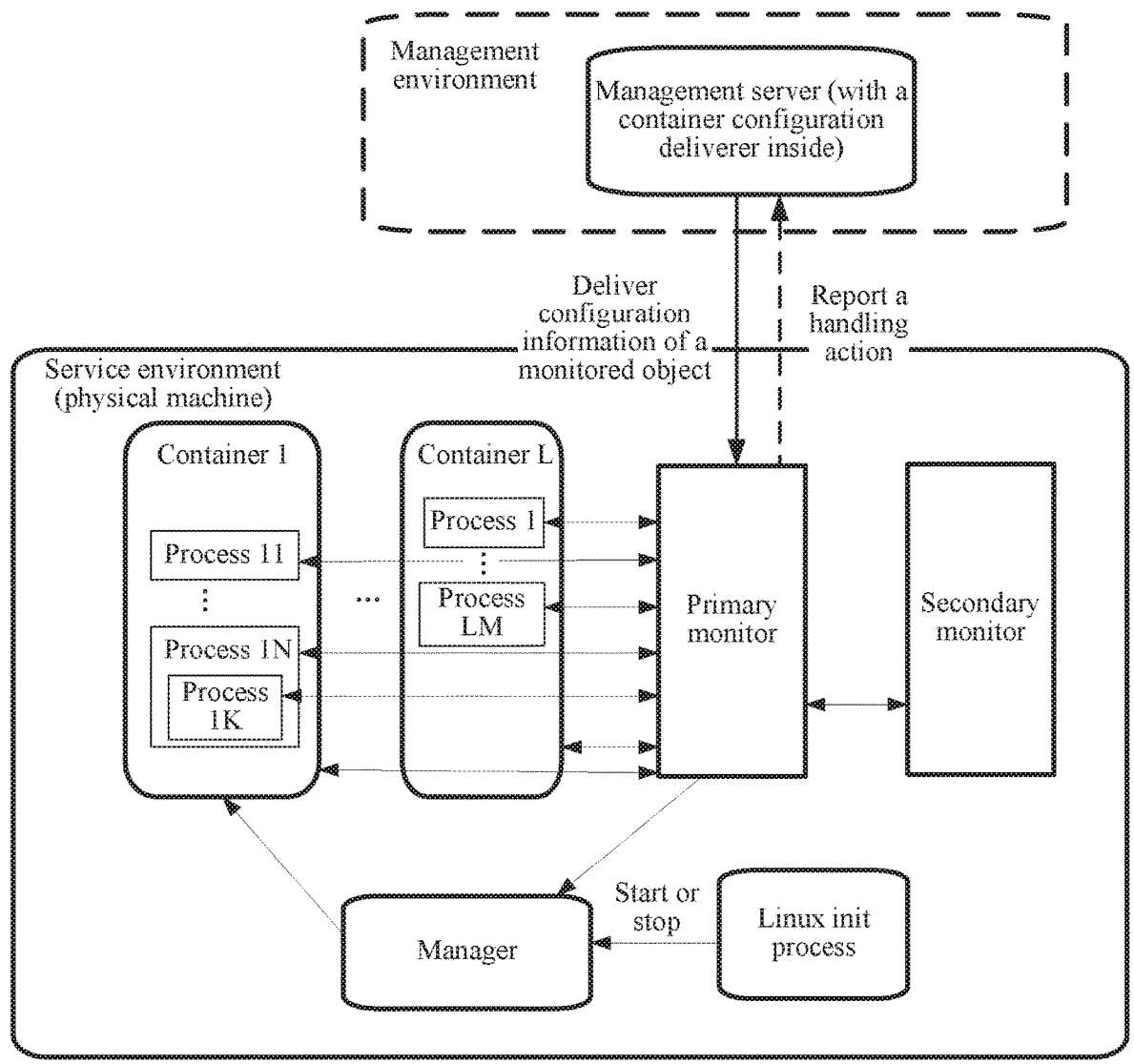
FIG. 3 is a schematic information exchange diagram of a container monitoring method according to an embodiment of the present invention.
Figure 4:
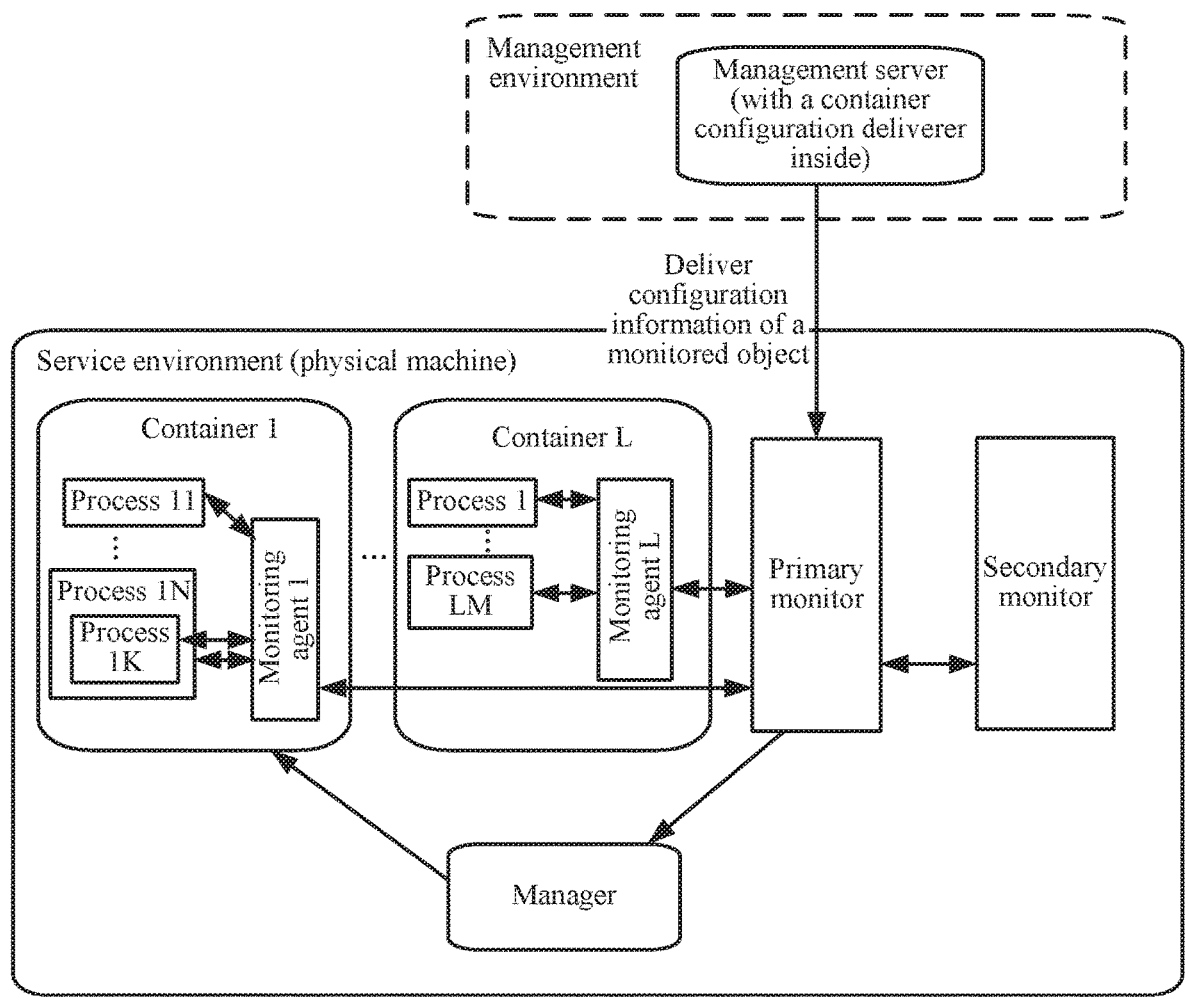
FIG. 4 is a schematic information exchange diagram of another container monitoring method according to an embodiment of the present invention.

A method according to an embodiment of the present invention is described below with reference to FIG. 2 to FIG. 4, FIG. 2 is a schematic flowchart of a container monitoring method according to an embodiment of the present invention. FIG. 3 is a schematic diagram of information exchange in a physical machine on which containers are deployed in an implementation manner of the method shown in FIG. 2, and is used to show some possible information exchange in the monitoring method corresponding to FIG. 2. Arrows in FIG. 3 represent directions of information exchange between modules. The method shown in FIG. 2 is applied to a physical machine, and used to monitor multiple monitored objects running on the physical machine. The multiple monitored objects include at least one of a container type, a process-in-container type, or a thread-in-container type. The physical machine includes a primary monitor. The method includes the following steps.

S201: The primary monitor obtains monitoring information respectively reported by the multiple monitored objects, where monitoring information of monitored objects of a same type in the multiple monitored objects is reported by using a same channel, each of the multiple monitored objects has a unique identifier, monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report.

The monitoring information of each monitored object includes at least one of the heartbeat information or the quality of service report. In an implementation manner, the heartbeat information may not include specific information about the running status of the monitored object reporting the heartbeat information. For example, the heartbeat information is only a character string or a signal. In this implementation manner, the heartbeat information specifically indicates that the monitored object reporting the heartbeat information runs normally in a period of time. That is, as long as the monitored object sends the heartbeat information, it indicates that the monitored object has performed a self-check, and various indexes related to running of the monitored object are normal. In another implementation manner, the heartbeat information includes specific information about the running status of the monitored object reporting the heartbeat information. For example, the heartbeat information is a data packet. In this implementation manner, regardless of whether a running status, in a period of time, of the monitored object reporting the heartbeat information is normal or abnormal, the heartbeat information is sent, and the primary monitor determines, according to content of the heartbeat information, whether the running status of the monitored object is normal. Certainly, the heartbeat information may include specific information about the running status of the monitored object reporting the heartbeat information, and specifically indicate that the monitored object reporting the heartbeat information runs normally in a period of time. Apparently, such a manner occupies an unnecessary resource. A specific form of the heartbeat information is not limited in this embodiment of the present invention.

Specifically, the heartbeat information is periodically reported, and corresponds to a heartbeat period, and the heartbeat period may be changeable.

That the monitored object runs normally means that a task of the monitored object is in a running state, does not deadlock, does not loop endlessly, and does not have a logical error, and the monitored object can provide a service for an application, rather than relates to only whether the task of the monitored object exits or not.

When reported monitoring information includes heartbeat information, a service status of a monitored object includes a running status of the monitored object. When reported monitoring information includes a quality of service report, a service status of a monitored object includes quality of service of an application carried on the monitored object.

Certainly, when reported monitoring information includes heartbeat information and a quality of service report, a service status of a monitored object includes a running status of the monitored object and quality of service of an application carried on the monitored object.

Because the multiple monitored objects all have unique identifiers, when the multiple monitored objects and the primary monitor run, the identifiers are stored in data zones of the monitored objects. In another aspect, the monitoring information reported by the multiple monitored objects is also stored in the data zones of the monitored objects correspondingly. The data zones of the monitored objects are in a memory of the physical machine. Therefore, the memory of an operating system of the physical machine can distinguish each monitored object. Specifically, the identifiers of the monitored objects are stored in a kernel mode memory of the operating system. The kernel mode memory includes the data zones of the monitored objects. A kernel mode of the monitor distinguishes monitoring information reporters by accessing the data zones in the kernel mode memory. Therefore, when running, the monitor can distinguish an identity of a monitored object by accessing the memory, instead of distinguishing an identity of a monitored object by using a channel used by the monitored object to report monitoring information (specifically distinguishing by using different channel interfaces). Therefore, different monitored objects of a same type may share a channel. It should be noted that correspondences between a container running on the physical machine, a process in the container, and a thread in the container, that is, to which process a thread belongs and to which container the process belongs, are known to the operating system, and may be indicated by using the unique identifiers, or indicated in a form of a mapping table or the like. For example, an identifier of a thread in a container may be a container-process-thread triplet.

S202: The primary monitor determines respective service statuses of the multiple monitored objects according to the monitoring information of the multiple monitored objects and identifiers of the multiple monitored objects.

It should be noted that, the multiple monitored objects may directly transfer the monitoring information to the primary monitor. Such a manner is referred to as centralized report. Alternatively, a container is used as a unit, there is a monitoring agent (generally a thread) in a monitored container, and the monitoring agent is configured to monitor a service status of a monitored object, and report monitoring information of the monitored object in the container to the primary monitor. Such a manner may be referred to as hierarchical report. Specifically, the monitoring agent may obtain related information from the primary monitor, record the related information in a local memory of the container, and push the related information to monitored objects in the container, as shown in FIG. 4. The hierarchical report may be performed when fine-grained monitoring is performed only on some particular containers and threads and processes in the containers, and another container requires only coarse-grained monitoring at a container level.

The container monitoring method provided in the foregoing embodiment is applied to a physical machine. Multiple monitored objects run on the physical machine. The monitored objects include at least one of a container type, a process-in-container type, or a thread-in-container type. Each of the multiple monitored objects has a unique identifier. Service statuses of the multiple monitored objects are determined according to monitoring information reported by the multiple monitored objects. In this procedure, monitored objects of a same type report monitoring information by using a same channel. This reduces resources consumed during monitoring in the prior art, and resolves a problem in the prior art that a requirement for multidimensional monitoring on a container cannot be met because only coarse-grained monitoring can be performed on a container due to high resource consumption. The container may be monitored in multiple dimensions including the container, a process in the container, and a thread in the container, and such multidimensional monitoring is also applicable to an intensive container deployment scenario.

Specifically, the determining, by the primary monitor, respective service statuses of the multiple monitored objects according to the monitoring information of the multiple monitored objects and identifiers of the multiple monitored objects includes:

determining, by the primary monitor according to a correspondence between data zones in which the monitoring information of the multiple monitored objects is located and the identifiers of the multiple monitored objects, the respective service statuses of the multiple monitored objects reporting the monitoring information, where the data zones are data zones of the multiple monitored objects reporting the monitoring information, and the data zones include at least one of a heap type or a stack type.

It should be noted that, a reporter of monitoring information refers to a monitored object reporting the monitoring information.

It should be noted that, in the prior art, due to isolation between containers, the multiple monitored objects running in a user mode are limited in terms of information obtaining. The multiple monitored objects cannot learn their unique identifiers in the operating system, and cannot add the identifiers to the monitoring information to enable the primary monitor to distinguish identities of monitoring information reporters. Therefore, in a prior-art solution, each monitored object is identified by using a channel in one-to-one correspondence with the monitored object. However, in the solution in this embodiment of the present invention, in a running procedure, the memory of the operating system also stores all attribute information of the multiple monitored objects, the primary monitor receives the monitoring information of the multiple monitored objects by using a channel interface, and determines, according to a correspondence between the data zones in which the reported monitoring information is located and the attribute information (which is specifically the identifiers) of the multiple monitored objects that is stored in the memory, which monitored objects the reported monitoring information is separately from. Therefore, the multiple monitored objects can share a channel to report the monitoring information, and a resource is saved. Specifically, the data zones each are at least one of the heap or the stack.

It should be understood that, when the operating system runs, the identifiers are registered in the memory of the operating system. Specifically, the identifiers are registered in the kernel mode memory of the operating system.

Further, the kernel mode of the primary monitor determines reporters of the monitoring information according to the correspondence between the data zones in which the monitoring information is located and the identifiers. The data zones each include at least one of the heap or the stack, and the data zones are the data zones of the multiple monitored objects reporting the monitoring information.

A user mode of the primary monitor determines the respective service statuses of the multiple monitored objects according to the monitoring information of the known reporters.

In another aspect, the user mode of the primary monitor may learn, according to the identifiers, the monitored objects reporting the monitoring information. There may be multiple implementation manners. For example, specifically, after identifying, according to the foregoing method (in this case, the identifiers are registered in the kernel memory), a monitored object reporting monitoring information, the kernel mode of the primary monitor adds an identifier of the corresponding monitored object to the monitoring information, so that the user mode of the primary monitor learns the monitored object reporting the monitoring information. Alternatively, the user mode of the primary monitor may not learn, by using the kernel mode, the monitored object reporting the monitoring information. This is not limited in this embodiment of the present invention.

In this embodiment of the present invention, the multiple monitored objects periodically report, according to respective running statuses, heartbeat information to a nearest "monitor" (the primary monitor or a monitoring agent) by using a communication channel. Specifically, an implementation manner may be as follows:

(1) A thread sends a heartbeat information of the thread.

(2) For a process, a thread in the process sends a heartbeat information "in the name of the process". In this case, the heartbeat information can indicate only a running status of the process in which the thread sending the heartbeat information is located, and cannot indicate a running status of another thread in the process in which the thread is located or a status of another resource of the thread. The "in the name of the process" may be adding an identifier of the process to the heartbeat information.

(3) For a container, a thread in a process in the container sends a heartbeat information "in the name of the container". In this case, the heartbeat information can indicate only a running status of the container in which the thread sending the heartbeat information is located, and cannot indicate a running status of another thread or another process in the container in which the thread is located. The "in the name of the container" may be adding an identifier of the container to the heartbeat information. It should be noted that, a specific heartbeat information sending rule may be set. For example, a container C has a process P1, and P1 has two threads: T1 and T2. If the rule is that "the container C and the process P1" perform reporting, and the reporting does not need to be performed as fine as a thread, when heartbeats of "the container C and the process P1" are received, it is considered that running statuses of the threads T1 and T2 are also included. If the rule is that C, P1, T1, and T2 all need to perform reporting, if only C and P1 perform reporting, statuses of T1 and T2 are not included. In this configuration case, T1 and T2 need to independently perform reporting.

(4) (Note: The "monitor" mentioned herein and below represents a "monitoring agent" or the "primary monitor". If centralized report is performed, a nearest "monitor" is the "primary monitor". If hierarchical report is performed, a nearest "monitor" is a "monitoring agent". A "monitor" mentioned below means a nearest "monitor". In addition, a monitored object does not learn such a difference, because the "monitoring agent" and the "primary monitor" both provide a unified-format interface and channel for a service provider, and the difference lies only in receivers on the other end of the channel.)

Specifically, the channel is a communication connection between files or processes.

It should be noted that, the channel refers to a communication channel used by the monitored object to transfer the monitoring information to the primary monitor, and may be a file. Each channel has a corresponding interface. In a case of centralized report, the channel is generally created by the primary monitor, and the primary monitor listens to monitoring information reported by a monitored object. In a case of hierarchical report, the channel is generally created by monitoring agents, and the monitoring agents listen to monitoring information reported by a monitored object.

Specifically, the channel is a communication connection between files or processes.

It should be noted that, in a specific implementation, the channel is generally created by the primary monitor.

S201 is described below by using specific implementation manners of the channel. The following four manners are applicable to both centralized report and hierarchical report unless specifically stated. It should be noted that, the following examples are merely intended for explanation and description, and do not constitute limitations to implementation manners of the method in this embodiment of the present invention.

In an implementation manner, the channel is a Proc file system, and S201 of obtaining, by the primary monitor, monitoring information respectively reported by the multiple monitored objects specifically includes:

receiving, by the primary monitor, the respective monitoring information that is reported by the multiple monitored objects by using one or more files in the Proc file system, where monitored objects of a same type in the multiple monitored objects share a same file in the Proc file system for reporting the monitoring information.

For example, in this case, the kernel mode part of the primary monitor provides three proc files for reporting monitoring information. Service providers write different proc files to indicate types of monitoring information reporters.

(a) All threads output respective heartbeat information by using a file /proc/$PID/task/$TID/heartbeat.

(b) All processes output respective heartbeat information by using a file /proc/$PID/heartbeat.

(c) All containers output respective heartbeat information by using a file /proc/heartbeat. (This manner is mainly used in centralized report.)

The user mode part of the primary monitor periodically reads the file.

In another implementation manner, the channel is a device file, and S202 of obtaining, by the primary monitor, monitoring information respectively reported by the multiple monitored objects specifically includes:

receiving, by the primary monitor, the respective monitoring information that is reported by the multiple monitored objects by using one or more device files, where monitored objects of a same type in the multiple monitored objects share a same device file for reporting the monitoring information.

Persons skilled in the art should understand, a file in the Proc file system is a virtual file, and the device file is impossibly the file in the Proc file system.

Certainly, to save a resource, all the monitored objects may share a device file to report the monitoring information. A command word or a flag bit or the like in the device file is used to indicate a type of a monitored object. This is not limited in this embodiment of the present invention.

For example, a kernel mode part of the "monitor" creates a device file (for example, /dev/watchdog) as a channel, and defines three command words (for example, THREAD_HB, PROCESS_HB, and CONTAINER_HB) to indicate types of monitoring information reporters. The monitored objects report the respective monitoring information to the primary monitor by using the device file.

A user mode part of the "monitor" obtains, also by using the device file, monitoring information reported by different types of monitored objects.

In still another implementation manner, the channel is a socket communication connection, and S202 of obtaining, by the primary monitor, monitoring information respectively reported by the multiple monitored objects specifically includes:

receiving, by the primary monitor, the respective monitoring information that is reported by the multiple monitored objects by using one or more socket communication connections, where monitored objects of a same type in the multiple monitored objects share a same socket communication connection address for reporting the monitoring information.

Specifically, the socket communication connection may be a Unix Domain socket communication connection.

For example, in this case, the user mode part of the "monitor" provides three socket channels and receives monitoring information. All monitored objects of a same type share a same channel.

(a) All threads use a same Unix Domain socket address to send a message.

(b) All processes use another same Unix Domain socket address to send a message.

(c) All containers use still another same Unix Domain socket address to send a message. (This manner is mainly used in centralized report.)

After monitoring information is reported, the kernel mode part of the "monitor" intercepts the monitoring information on a Unix Domain socket data sending path, identifies an identity of a sender, and then adds an identity of a monitored object, for example, a container-process-thread identifier triplet, to a packet, so that the user mode part of the "monitor" obtains monitoring information of a known reporter.

In yet another implementation manner, the channel is an inter-process communication (Inter-Process Communication, IPC) channel, the multiple monitored objects include at least one of a process type or a thread type, a container in which each of the multiple monitored objects is located includes a monitoring thread, and the obtaining, by the primary monitor, monitoring information respectively reported by the multiple monitored objects includes:

receiving, by the primary monitor, the monitoring information that is reported by the multiple monitored objects by using respective corresponding monitoring threads, where monitored objects of a same type in the multiple monitored objects share a same IPC channel for communication with the primary monitor to report the monitoring information.

This implementation manner is generally used in hierarchical report. For example, in this case, the user mode part of the "monitor" creates two keys of POSIX IPC or SystemV IPC (because the primary monitor is located in IPC namespace different from that of containers, the solution can be used only in hierarchical report, and is used by a process and a thread to report monitoring information separately), and receives a queue. All monitored objects of a same type share a same key (that is, a channel). The kernel mode part of the "monitor" intercepts a reported packet, identifies an identity of a sender, and then adds identity information of a monitoring information reporter, for example, a container-process-thread identifier triplet, to the packet, so that the user mode part of the "monitor" obtains monitoring information of the known reporter.

Likewise, in hierarchical report, reporting from the monitoring agent to the primary monitor may also be implemented in the foregoing four modes. Details are not described again in this embodiment of the present invention.

Further, in this embodiment, before S201, the method further includes the following step:

S200: The primary monitor determines configuration information of the multiple monitored objects.

Specifically, in one aspect, when the monitoring information is the heartbeat information, S200 includes: determining, by the primary monitor, configuration information of the multiple monitored objects, where the configuration information of the multiple monitored objects includes identity information, heartbeat information reporting manners, and heartbeat periods of the multiple monitored objects, the identity information of the multiple monitored objects includes the identifiers of the multiple monitored objects, the heartbeat information reporting manners indicate types of the channels, and the heartbeat periods indicate time intervals for reporting heartbeat information by the monitored objects during normal running; and pushing, by the primary monitor, the respective heartbeat information reporting manners to the multiple monitored objects, where the multiple monitored objects are determined according to the identifiers in the identity information.

It should be noted that, the type of the channel indicates an implementation manner of the channel, such as the file in the Proc file system, the device file, the socket communication connection, or the IPC channel mentioned above.

Correspondingly, in this case, S201 specifically includes the following step:

S201a: The primary monitor obtains heartbeat information respectively reported by the multiple monitored objects, where the heartbeat information is reported according to the respective corresponding heartbeat information reporting manners of the multiple monitored objects.

Correspondingly, S202 specifically includes S202a: The primary monitor determines respective running statuses of the multiple monitored objects according to the heartbeat periods and the heartbeat information of the multiple monitored objects.

Specifically, heartbeat information is periodically reported, and a period is a heartbeat information reporting threshold. Therefore, the heartbeat information may indicate a running status, in a period of time (that is, within the heartbeat information reporting threshold), of a monitored object reporting the heartbeat information. If a monitored object does not report heartbeat information within a heartbeat information reporting threshold, it may be considered that the monitored object runs abnormally. If a monitored object reports heartbeat information within a heartbeat information reporting threshold, and the heartbeat information includes specific information describing a running status, the primary monitor may determine, according to the information, whether the monitored object runs normally. This is not limited in this embodiment of the present invention.

Furthermore, the configuration information of the multiple monitored objects further includes handling policies for abnormal running of the multiple monitored objects, the identity information further includes at least one of a subordination relationship or a cooperation relationship of the multiple monitored objects, and the physical machine further includes a manager. In this case, the method further includes S203. Specifically, S203 herein is S203a.

S203a: The primary monitor determines, according to the handling policies for abnormal running, a handling action on a monitored object running abnormally in the multiple monitored objects and an associated monitored object, where a subordination relationship or a cooperation relationship exists between the associated monitored object and at least one of the monitored object running abnormally; and the manager handles the monitored object running abnormally in the multiple monitored objects and the associated monitored object according to the handling action.

It should be noted that, the associated monitored object may include one or more of the multiple monitored objects, or may include another container and/or another process in a container and/or another thread in a container in the operating system of the physical machine other than the multiple monitored objects. That is, the associated monitored object includes at least one of a container type, a process-in-container type, or a thread-in-container type in the operating system of the physical machine. All associated monitored objects mentioned below in this embodiment of the present invention are understood like that. Details are not described again below.

Certainly, for S202a and S203a, if the primary monitor fails to receive heartbeat information that is reported by a monitored object within a heartbeat information reporting threshold, it indicates that the monitored object runs abnormally, and the primary monitor may not need to determine a running status of the monitored object, but directly trigger a step of delivering information such as a handling action to the manager, so that the manager handles the monitored object.

In another aspect, when the monitoring information is the quality of service report, S200 includes:

determining, by the primary monitor, configuration information of the multiple monitored objects, where the configuration information of the multiple monitored objects includes identity information, quality of service report reporting manners, and quality of service requirements of the multiple monitored objects, the identity information of the multiple monitored objects includes the identifiers of the multiple monitored objects, the quality of service report reporting manners indicate types of the channels, and the quality of service requirements are used to determine whether QoS of applications carried on the multiple monitored objects is qualified; and pushing, by the primary monitor, the respective quality of service report reporting manners to the multiple monitored objects, where the multiple monitored objects are determined according to the identifiers in the identity information.

It should be noted that, the type of the channel indicates an implementation manner of the channel, such as the file in the Proc file system, the device file, the socket communication connection, or the IPC channel mentioned above.

Correspondingly, in this case, S201 specifically includes the following step:

S201b: The primary monitor obtains quality of service reports respectively reported by the multiple monitored objects, where the quality of service reports are reported according to the respective corresponding quality of service report reporting manners of the multiple monitored objects.

Correspondingly, in this case, S202 specifically includes the following step:

S202b: The primary monitor determines, according to the quality of service requirements and the quality of service reports of the multiple monitored objects, whether the quality of service of applications respectively carried on the multiple monitored objects is qualified.

Furthermore, the configuration information of the multiple monitored objects further includes handling policies for non-qualified quality of service, the identity information further includes at least one of a subordination relationship or a cooperation relationship of the multiple monitored objects, and the physical machine further includes a manager. In this case, the method further includes S203, Specifically, S203 herein is S203b.S203b: The primary monitor determines, according to the handling policies for non-qualified quality of service, a handling action on a monitored object whose quality of service is non-qualified in the multiple monitored objects and an associated monitored object; and the manager handles the monitored object whose quality of service is non-qualified in the multiple monitored objects and the associated monitored object according to the handling action, where a subordination relationship or a cooperation relationship exists between the associated monitored object and at least one of the monitored object whose quality of service is non-qualified.

The foregoing two cases may be summarized as follows: The primary monitor determines the service statuses of and handling actions on the multiple monitored objects, and delivers identity information of and handling actions on monitored objects whose quality of service statuses are abnormal in the monitored objects to the manager. The manager handles the monitored objects whose quality of service statuses are abnormal and an associated monitored object.

It should be noted that, in this embodiment of the present invention, a subordination relationship between monitored objects means that an object includes one or more other objects. For example, a container includes a process or a process includes a thread. Alternatively, the subordination relationship means that an object creates one or more other objects, and is specifically referred to as a parent-child relationship. For example, a process creates another process or a thread. A cooperation relationship between monitored objects means that multiple monitored objects execute a same task or serve a same application. For example, an application is deployed on multiple containers, or a process needs to depend on another process when providing a service. The cooperation relationship sometimes may be referred to as a service dependency relationship.

It may be understood that, the monitoring information may alternatively include the heartbeat information and the quality of service report, and a service status of a monitored object includes a running status of the monitored object and quality of service of an application carried on the monitored object. For content included in configuration information and specific implementation of S203 in this case, refer to the foregoing description. Details are not described again herein. In this case, monitoring is more comprehensive. Running statuses of a container and a thread and process in the container can be monitored, and whether quality of service of an application is qualified can also be monitored.

In conclusion, when the physical machine in a virtual environment includes a manager, S203 may be summarized as follows:

S2031: The primary monitor delivers a handling action for abnormal service statuses of the multiple monitored objects to the manager according to the reported monitoring information and the configuration information; and the manager handles a monitored object whose quality of service status is abnormal in the multiple monitored objects and an associated monitored object according to the handling action.

For specific details, refer to the foregoing description of S203. Details are not described again.

It should be noted that, in the foregoing monitoring method, a monitored object may further include a manager. A service status (including at least one of a running status or quality of service) of the manager can also be monitored, and the manager is handled (for example, restarted) according to a handling policy when the manager fails or is faulty. Specific implementation details are the same as those in the foregoing method. Details are not described again herein. In conclusion, this embodiment of the present invention supports comprehensive monitoring in four dimensions: a manager, a container, a process, and a thread, provides, for a lightweight virtualization environment (specifically referring to a container technology), a comprehensive solution in which a handling policy may be customized and modified according to a requirement, and helps to improve a system RAS (Reliability, Availability and Serviceability, reliability, availability and serviceability) capability.

It should be noted that, the primary monitor and the manager are both modules named in terms of function. In some cases, the primary monitor also has a manager function, and the primary monitor is the manager in this embodiment of the present invention from another perspective. That is, the primary monitor and the manager may be a same module. Specifically, the module may include one or more threads (or processes). In other words, in another embodiment, the primary monitor has functions of both the primary monitor and the manager in the foregoing embodiment, and S203 may be summarized as follows:

S2032: The primary monitor handles a monitored object whose quality of service status is abnormal in the multiple monitored objects and an associated monitored object according to the reported monitoring information and the configuration information of the multiple monitored objects.

For specific details, refer to the foregoing description of S203. Details are not described again.

It should be noted that, the embodiment including step S200 describes a procedure in which the primary monitor performs some operations on the multiple monitored objects according to the configuration information of the multiple monitored objects, so that the monitored objects report the monitoring information to the primary monitor. The configuration information may be customized and stored in the primary monitor in advance, or may be input by a user before monitoring. In most cases, the configuration information is delivered by a container configuration deliverer to the primary monitor. This is not limited in the present invention.

The configuration information of the multiple monitored objects may include:

identity information of the multiple monitored objects, for example, a list about the multiple monitored objects (which may include at least one of a manager type, a container type, a process-in-container type, or a thread-in-container type). The list includes the identifiers of the multiple monitored objects, a parent-child relationship and a service dependency relationship between the multiple monitored objects, and the like. When whether running is abnormal needs to be monitored, the configuration information further includes: heartbeat information reporting manners of the monitored objects, for example, several manners mentioned above and some other implementation manners in which monitored objects of a same type can use a same channel for reporting; reliability failure endurance durations, that is, the heartbeat periods, for example, the primary monitor detects that a monitored object does not report heartbeat information within 60 s, and the primary monitor triggers a handling policy for abnormal running; and handling policies for abnormal running of the monitored objects, for example, when a process runs abnormally, the process is reset, or the process is reset and a container in which the process is located, or a container running abnormally and a container associated with the container are reset. When the heartbeat information is a data packet and includes running information of the monitored objects, the configuration information further includes information used to determine, according to the running information, whether running is abnormal. For example, a field has a value of A, and indicates that an index is abnormal and it may be considered that running is abnormal, or a field indicates a cause of abnormal running.

When whether quality of service is qualified needs to be monitored, the configuration information further includes a served item of each of the multiple monitored objects, for example, a list; quality of service report reporting manners, for example, several manners mentioned above and some other implementation manners in which monitored objects of a same type can use a same channel for reporting; quality of service requirements, for example, a page reading time for a Web service process is not greater than 5 µs; and handling policies for non-qualified quality of service, for example, when the Web service process crashes n times when reading a page, the process is reset, or the process is reset and a container in which the process is located, or a container running abnormally and a container associated with the container are reset.

Which content the configuration information may specifically include in some actual application scenarios is described above by using examples.

The following describes, by using examples, possible content of handling policies for abnormal running of different types of monitored objects or for non-qualified quality of service of carried applications. It should be noted that, the handling policies may be customized and modified.

In the following description, "quality of service of a carried application is non-qualified" is briefly described as "quality of service is non-qualified".

For a container, if running is abnormal or quality of service is non-qualified, the container and an associated monitored object having a cooperation relationship with the container are reset. Further, if a quantity of times that a container is restarted within a given duration exceeds a threshold, the entire host is restarted. Alternatively, the entire host is directly restarted, or a service on the container is re-scheduled.

For a process in a container, if running is abnormal or quality of service is non-qualified, the process in the container and an associated monitored object having a cooperation relationship or a parent-child relationship with the process are reset. Further, if a quantity of times that a process in a container is restarted within a given duration exceeds a threshold, the process is restarted, or the container in which the process is located is restarted.

For a thread in a container, if running is abnormal or quality of service is non-qualified, a process in which the thread is located is restarted.

It should be understood that, the handling action is a specific operation on a monitored object, where the operation is determined according to a service status of the monitored object and a handling policy. Generally, the manager performs the handling action delivered by the primary monitor, that is, operates the corresponding monitored object and an associated monitored object directly according to the handling action. Using a container as an example, if a service status of the container is that running is abnormal or quality of service is non-qualified, and a handling policy for the container is that if running is abnormal or quality of service is non-qualified, the container and an associated monitored object having a cooperation relationship with the container are reset, a handling action is resetting the container and the associated monitored object having a cooperation relationship with the container. Therefore, the manager resets, according to the handling action, the container and the associated monitored object having a cooperation relationship with the container. In a more specific example, a handling policy is that if a quantity of times that a container is restarted within a given duration exceeds three times, the entire host is restarted. If a service status of the container is that the container is restarted four times within the given duration, a handling action is restarting the entire host. Similarly, relationships between service statuses of a thread and a process, handling policies, and handling actions, and handling action determining manners are not described in detail again in this embodiment of the present invention.

Optionally, the physical machine further includes a sending module. Correspondingly, the method may further include the following step:

S205: The sending module sends a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitor according to the service statuses of the multiple monitored objects and handling policies for abnormal service statuses.

The handling action in this optional step is specifically determined by the monitor on the physical machine according to the service statuses of the multiple monitored objects and the handling policies for abnormal service statuses of the multiple monitored objects.

It should be noted that, in some cases, the embodiment of the method includes S203 or a step corresponding to S203, and S205. Alternatively, in some cases, the embodiment of the method may not include S203 or the step corresponding to S203 (refer to the following description) but include only S205.

S205 is mainly performed in a case as follows: A handling policy for a abnormal service status of a monitored object is re-scheduling the monitored object, for example, re-scheduling the monitored object or an application (or a service) on the monitored object. More specifically, for example, an application on a monitored object is deployed onto a monitored object on another physical machine. The re-scheduling may be performed between physical machine nodes. It should be noted that, in S205, the monitored object is generally of a container type.

Specifically, the physical machine in this embodiment of the present invention may further include a scheduler. The scheduler is configured to: when a monitored object runs abnormally or its quality of service is non-qualified, perform a handling action, delivered by the primary monitor, of re-scheduling an application or a service on the monitored object. The handling action is determined by the primary monitor according to a physical machine resource on which the monitored object is located or a network resource on which the physical machine is located. Alternatively, the scheduler is configured to perform a corresponding handling action according to a handling policy delivered by the primary monitor. The handling policy is that when a monitored object runs abnormally or its quality of service is non-qualified, an application or a service on the monitored object is re-scheduled according to a physical machine resource on which the monitored object is located or a network resource on which the physical machine is located. For example, when the monitored object is a container, an application or a service on a container is allocated to one or more other containers. The one or more containers may include a container located on a physical machine different from that of the monitored object. The scheduler module is similar to the manager module or the primary monitor module, and may be one or more processes or threads. It should be noted that, the scheduler is named in terms of function. In implementations of some cases, the manager or the primary monitor may also support a scheduler function, and the manager or the primary monitor supporting the scheduler function is the scheduler in this embodiment of the present invention from another perspective. That is, the manager and the scheduler, or the primary monitor, the manager, and the scheduler may be a same module. Specifically, the module may include one or more threads (or processes), and may be in a service environment (for example, be on a physical machine the same as or different from that of a to-be-handled monitored object), or may be in a management environment, for example, be on a management server (or referred to as a gateway, a scheduling server, or the like). S205 describes a case in which the scheduler is located in the service environment or the management environment. The case is more suitable for globally scheduling a network resource. An order between S205 and S203 is not limited in this embodiment of the present invention. A specific implementation manner of re-deploying a monitored object by using the scheduler is not limited in this embodiment of the present invention.

In another aspect, a user may further modify or optimize a handling policy by using the primary monitor, for example, according to the configuration information and the monitoring information collected by the primary monitor. Furthermore, the primary monitor may further send the modified or optimized handling policy to a physical machine in the management environment (for example, the management server) by using an output unit, so that the physical machine in the management environment updates the stored original handling policy. The physical machine sends the handling policy part to the management server, and the management server may perform modification, replacement, or addition on the handling policy in the management server according to the handling policy part. In this way, the handling policy in the management server can be updated and modified. The modification and update are made by the monitor according to an actual service status. Therefore, accuracy and compliance with scenarios are ensured.

Figure 5:
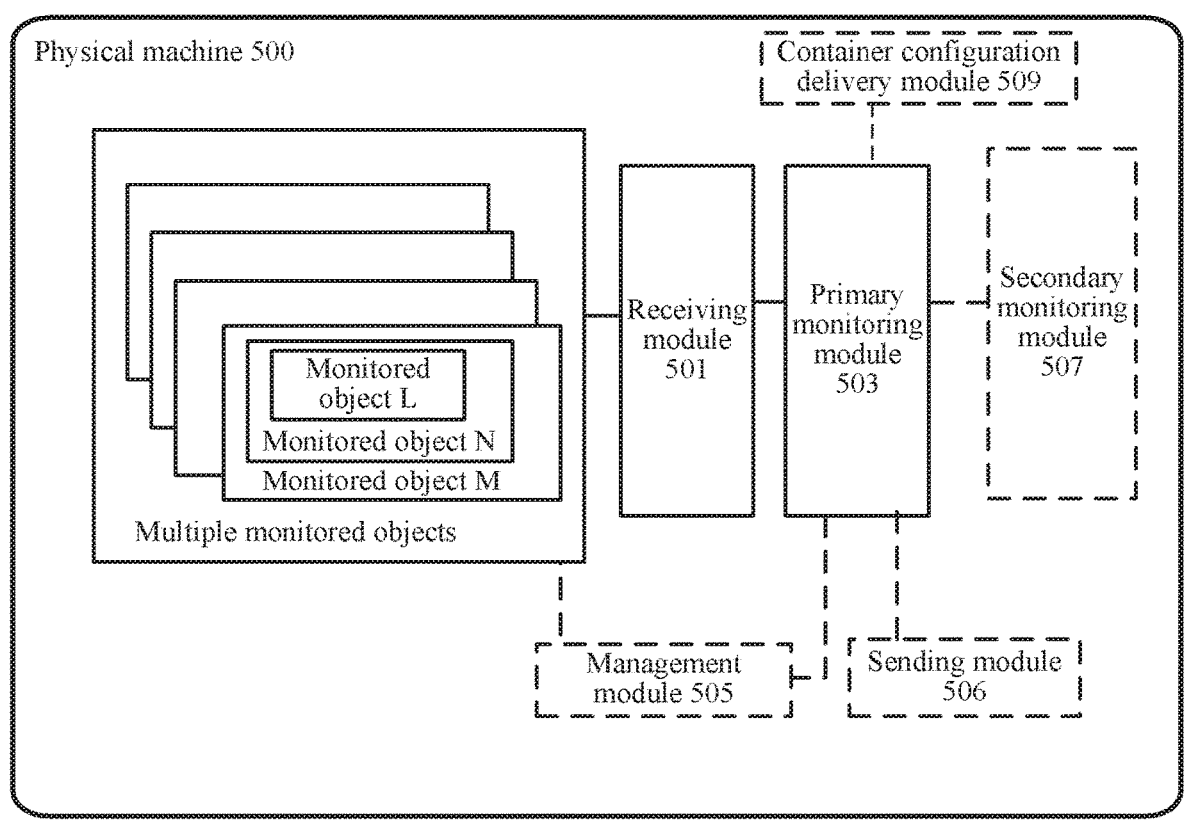
FIG. 5 is a schematic structural diagram of a physical machine according to an embodiment of the present invention.
Figure 7:
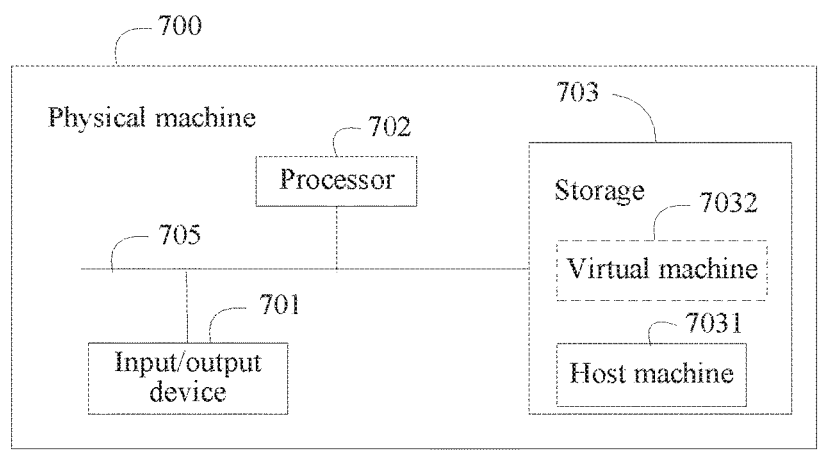
FIG. 7 is a schematic structural diagram of still another physical machine according to an embodiment of the present invention.

It should be noted that, explanations and descriptions of steps and related terms in the foregoing method embodiment are also applicable to apparatus embodiments (an embodiment of FIG. 5 and the first embodiment corresponding to FIG. 7) corresponding to the method, and are not repeated in the apparatus embodiments of FIG. 5 and FIG. 7.

In conclusion, the monitoring method in the foregoing embodiment is applied to a physical machine. A primary monitor pushes respective monitoring information reporting manners of multiple monitored objects to the multiple monitored objects. The multiple monitored objects include at least one of a container type, a process-in-container type, or a thread-in-container type. Each of the multiple monitored objects has a unique identifier. Monitored objects of a same type in the multiple monitored objects use a same file mode or channel to report monitoring information. This greatly reduces quantities of threads and socket ports consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to a current intensive container distribution scenario. Further, the primary monitor may perform some operations on the multiple monitored objects according to configuration information about the multiple monitored objects, so that the monitored objects report monitoring information to the primary monitors, and the primary monitor enables a manager to process a monitored object whose quality of service status is abnormal. In this way, a complete set of solution for improving reliability and serviceability of a lightweight virtualization container technology is provided, and a requirement for customized fine-grained monitoring and abnormality handling in the application scenario can be better met.

In another container monitoring method described in an embodiment of the present invention, a monitored object does not need to report its status. In this way, programming work can be reduced, and a monitoring method in which a third-party application is used can also be supported. The container monitoring method may be referred to as intelligent detection report. The container monitoring method is used to monitor multiple monitored objects running on a physical machine. The multiple monitored objects include at least one of a container type, a process-in-container type, or a thread-in-container type. The physical machine includes a primary monitor. The monitoring method includes:

determining, by the primary monitor, service statuses of the multiple monitored objects by detecting information about execution of instructions by the multiple monitored objects, where the instruction includes a specified address, and the service status includes at least one of a running status or quality of service.

Specifically, each of the multiple monitored objects has a unique identifier, and in the aspect of determining, by the primary monitor, service statuses of the multiple monitored objects by detecting information about execution of instructions by the multiple monitored objects, the primary monitor determines the respective service statuses of the multiple monitored objects according to a correspondence between data zones in which the execution information of the instructions is stored and identifiers of the multiple monitored objects, where the data zones are data zones of the multiple monitored objects reporting the monitoring information, and the data zones include at least one of a heap type or a stack type.

Specifically, the instructions may be some specified functions. The primary monitor determines the service statuses of the multiple monitored objects according to call statuses of the specified functions. Specifically, the specified functions are generally cyclically called (for example, called every period of time) by the multiple monitored objects when the multiple monitored objects run or provide a service. Alternatively, the specified functions may be some key functions, that is, monitoring is performed according to execution statuses of the key functions. For example, a key function fails to be executed or a returned value is x to y, and running is abnormal. Specifically, the execution statuses of the instructions may be detected by using a pile or a probe.

Different monitored objects may correspond to different specified functions. Therefore, the service statuses of the multiple monitored objects may be determined by using the specified functions.

For a type of monitored object, the instruction may be specifically a syscall system call, and is a function. In this case, a determining rule may be made according to a system task status of the monitored object and a status of executing the syscall system call by the monitored object.

That is, the primary monitor determines a service status of the monitored object according to the system task status and the syscall system call execution status of the monitored object. The service status includes at least one of a running status or quality of service of monitored object. The determining rule is applicable to a first subset of the multiple monitored objects. Monitored objects in the first subset frequently execute the syscall system call when running and serving an application. Therefore, by detecting, in a kernel, statuses of executing the syscall system call by the monitored objects, and according to system task statuses of the monitored objects, the primary monitor may accurately determine whether service statuses of the monitored objects are abnormal. For example, the determining rule may be as follows: If a status of a thread A in a system is X or Y for more than T seconds, the thread A runs abnormally. For example, the status is executing a select or poll system call (for example, in this case, it may be detecting an endless loop or a deadlock state). If a thread K calls write syscall once within 5 seconds, a status is normal. If statuses of a thread A and a thread B are normal, a status of a process C is normal. If statuses of a process D and a process E are normal, a status of a container F is normal. If statuses of all processes in a container A are normal, the container is normal. If a status of a key process A in a container is normal, the container is normal or statuses of all processes in the container are normal. If CPU usage and memory usage of a container do not exceed a threshold, the container is normal.

It should be understood that, system task statues of different types of monitored objects in different operating systems may be specifically different. For example, persons skilled in the art generally consider as follows: Five major states of a thread are new (new), runnable (runnable), running (running), blocked (blocked), and dead (dead). States of a process are generally running (TASK_RUNNING), runnable, and blocked. Specifically, in a Linux system, states of a process are classified relatively fine, for example, R (TASK_RUNNING), an executable state (including: In many operating system textbooks, a state of a process that is currently executed on a CPU is defined as a running state, and a state of a process that can be executed but has not been scheduled is defined as a ready state); S (TASK_INTERRUPTIBLE), an interruptible sleep state; D (TASK_UNINTERRUPTIBLE), an uninterruptible sleep state; T (TASK_STOPPED or TASK_TRACED), a stopped state or a traced state; Z (TASK_DEAD-EXIT_ZOMBIE), an exit state (a process becomes a zombie process); and X (TASK_DEAD-EXIT_DEAD), an exit state, where a process is to be destructed. Certainly, in some cases, system task statuses may alternatively be defined by a user.

In another aspect, the monitored objects may further include a type of container, process, or thread that scarcely execute or does not execute the syscall system call because an application served by the type of monitored object scarcely accesses the syscall system call (for example, exclusive core occupation with polling and busy forwarding). In this case, accuracy and efficiency of monitoring a service status by using a determining rule decreases. In this case, a probe or a pile may be used to detect execution statuses of some instructions having specified addresses (specifically referring to some specified functions in some cases) in threads or processes in containers or monitor some execution data to determine service statuses of monitored objects. The instructions having the specified addresses mean that each time the instructions are executed, addresses accessed by a processor are constant. The specified functions and the instructions having the specified address are usually set in a targeted way according to specific monitored objects, and generally are functions or instructions that need to be frequently executed when the monitored objects run or provide a service, or some important and key functions or instructions when the monitored objects run or provide a service. It should be noted that, due to isolation between containers, using a probe or a pile to detect a process and a thread in a container is different from using a probe or a pile to detect a process and a thread outside a container. For example, a solution of systemtap+uprobe+"user mode rule" may be used to determine a status of a thread. Examples of the user mode rule are as follows:

(1) Example 1: If a thread A runs to a function F within 5 s, and a returned value is 0, a status is normal.

(2) Example 2: If a thread B runs to a function P within 1 s, and a parameter X ranges from 0 to 100, a status is normal.

(3) Example 3: If a thread C runs to a binary address 0xABCDEF0 of the thread within 1 s, a status is normal.

(4) Example 4: If a thread D runs to a function K, within is, and a global variable Y++ every second, a status is normal.

The foregoing embodiment provides a container monitoring method. The monitoring method is applied to a physical machine. A primary monitor determines service statuses of multiple monitored objects according to execution information of specified instructions. The multiple monitored objects include at least one of a container type, a process-in-container type, or a thread-in-container type. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. The container may be monitored in multiple dimensions including the container, a process in the container, and a thread in the container, and such multidimensional monitoring is also applicable to an intensive container deployment scenario.

Optionally, when the service status is the running status, the physical machine further includes a manager. The method further includes:

determining, by the primary monitor, identity information of the multiple monitored objects and handling policies for abnormal running, where the identity information of the multiple monitored objects includes at least one of a subordination relationship or a cooperation relationship of the multiple monitored objects and the identifiers of the multiple monitored objects;

determining, by the primary monitor, a handling action on a monitored object running abnormally and an associated monitored object according to the identity information and running statuses of multiple monitored objects and the handling policies for abnormal running, where a subordination relationship or a cooperation relationship exists between the associated monitored object and at least one of the monitored object running abnormally; and handling, by the manager, the monitored object running abnormally in the multiple monitored objects and the associated monitored object according to the handling action.

It should be noted that, in this implementation manner, the primary monitor determines the service statuses of the multiple monitored objects by detecting the execution information of the instructions of the multiple monitored objects. The instruction includes a specified address. Each of the multiple monitored objects has a unique identifier. The multiple monitored objects are determined by the primary monitor according to the identifiers in the identity information. The service status includes at least one of a running status and quality of service.

Optionally, when the service status is the quality of service, the physical machine further includes a manager. The method further includes:

determining, by the primary monitor, identity information of the multiple monitored objects and handling policies for non-qualified quality of service, where the identity information of the multiple monitored objects includes at least one of a subordination relationship or a cooperation relationship of the multiple monitored objects and the identifiers of the multiple monitored objects;

determining, by the primary monitor, a handling action on a monitored object whose quality of service is non-qualified and an associated monitored object according to the identity information and quality of service of multiple monitored objects and the handling policies for non-qualified quality of service, where a subordination relationship or a cooperation relationship exists between the associated monitored object and at least one of the monitored object whose quality of service is non-qualified; and handling, by the manager, the monitored object whose quality of service is non-qualified in the multiple monitored objects and the associated monitored object according to the handling action.

It should be noted that, in this implementation manner, the primary monitor determines the service statuses of the multiple monitored objects by detecting the execution information of the instructions of the multiple monitored objects. The instruction includes a specified address. Each of the multiple monitored objects has a unique identifier. The multiple monitored objects are determined by the primary monitor according to the identifiers in the identity information. The service status includes at least one of a running status and quality of service.

The foregoing two cases may be summarized as follows: The primary monitor determines the service statuses of and handling actions on the multiple monitored objects, and delivers handling actions on monitored objects whose quality of service statuses are abnormal in the monitored objects to the manager. The manager handles the monitored objects whose quality of service statuses are abnormal and an associated monitored object.

It should be noted that, in this embodiment of the present invention, a subordination relationship between monitored objects means that an object includes one or more other objects. For example, a container includes a process or a process includes a thread. Alternatively, the subordination relationship means that an object creates one or more other objects, and is specifically referred to as a parent-child relationship. For example, a process creates another process or a thread. A cooperation relationship between monitored objects means that multiple monitored objects execute a same task or serve a same application. For example, an application is deployed on multiple containers, or a process needs to depend on another process when providing a service. The cooperation relationship sometimes may be referred to as a service dependency relationship.

It should be noted that, the monitoring method in this embodiment of the present invention is a procedure in which the primary monitor performs some operations on the multiple monitored objects according to configuration information about the multiple monitored objects, so that the primary monitor obtains monitoring information of the monitored objects. The configuration information herein mainly includes identity information, determining policies (for example, determining rules, or call statuses of specified functions, or instruction execution information), and handling policies. The configuration information may be customized and stored in the primary monitor in advance, or may be input by a user before monitoring. In most cases, the configuration information is delivered by a container configuration deliverer to the primary monitor. This is not limited in the present invention. For descriptions of the identity information of the monitored objects, handling policies for abnormal running of the monitored objects, and handling policies for non-qualified quality of service of monitored objects, refer to description parts in the monitoring method in which monitoring information is reported in the foregoing embodiment of the present invention. Details are not described again herein. In another aspect, a user may further modify or optimize a handling policy by using the primary monitor, for example, according to the configuration information and the monitoring information collected by the primary monitor. Furthermore, the primary monitor may further send the modified or optimized handling policy to a physical machine in a management environment (for example, the management server) by using an output unit, so that the physical machine in the management environment updates the stored original handling policy.

It should be understood that, the handling action is a specific operation on a monitored object, where the operation is determined according to a service status of the monitored object and a handling policy. Generally, the manager performs the handling action delivered by the primary monitor, that is, operates the corresponding monitored object and an associated monitored object directly according to the handling action. Using a container as an example, if a service status of the container is that running is abnormal or quality of service is non-qualified, and a handling policy for the container is that if running is abnormal or quality of service is non-qualified, the container and an associated monitored object having a cooperation relationship with the container are reset, a handling action is resetting the container and the associated monitored object having a cooperation relationship with the container. Therefore, the manager resets, according to the handling action, the container and the associated monitored object having a cooperation relationship with the container. In a more specific example, a handling policy is that if a quantity of times that a container is restarted within a given duration exceeds three times, the entire host is restarted. If a service status of the container is that the container is restarted four times within the given duration, a handling action is restarting the entire host. Similarly, relationships between service statuses of a thread and a process, handling policies, and handling actions, and handling action determining manners are not described in detail again in this embodiment of the present invention.

It should be noted that, in the foregoing monitoring method, a monitored object may further include a manager. A service status (including at least one of a running status or quality of service) of the manager can also be monitored, and the manager is handled (for example, restarted) according to a handling policy when the manager fails or is faulty. Specific implementation details are the same as those in the foregoing method. Details are not described again herein. In conclusion, this embodiment of the present invention supports comprehensive monitoring in four dimensions: a manager, a container, a process, and a thread, provides, for a lightweight virtualization environment (specifically referring to a container technology), a comprehensive solution in which a handling policy may be customized and modified according to a requirement, and helps to improve a system RAS (Reliability, Availability and Serviceability, reliability, availability and serviceability) capability.

It should be noted that, the primary monitor and the manager are both modules named in terms of function. In some cases, the primary monitor also has a manager function, and the primary monitor is the manager in this embodiment of the present invention from another perspective. That is, the primary monitor and the manager may be a same module. Specifically, the module may include one or more threads (or processes). In other words, in another embodiment, the primary monitor has functions of both the primary monitor and the manager in the foregoing embodiment. For a specific implementation of a method in which monitoring is performed by using a determining rule or an instruction having a specified address or a specified function in this case, refer to the foregoing description. Details are not described again herein.

Optionally, in another aspect, the physical machine further includes a sending module. The method may further include the following step:

sending, by the sending module, a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitor according to the service statuses of the multiple monitored objects and handling policies for abnormal service statuses.

It should be noted that, the handling action in this optional step is specifically determined by the monitor on the physical machine according to the service statuses of the multiple monitored objects and the handling policies for abnormal service statuses of the multiple monitored objects.

This optional step is mainly performed in a case as follows: A handling policy for a abnormal service status of a monitored object is re-scheduling the monitored object, for example, re-scheduling the monitored object or an application (or a service) on the monitored object. More specifically, for example, an application on a monitored object is deployed onto a monitored object on another physical machine. The re-scheduling may be performed between physical machine nodes. It should be noted that, the monitored object is generally of a container type.

Specifically, the physical machine in this embodiment of the present invention may further include a scheduler. The scheduler is configured to: when a monitored object runs abnormally or its quality of service is non-qualified, perform a handling action delivered by the primary monitor. The handling action is specifically re-scheduling an application or a service on the monitored object, and is determined by the primary monitor according to a physical machine resource on which the monitored object is located or a network resource on which the physical machine is located. Alternatively, the scheduler is configured to perform a corresponding handling action according to a handling policy delivered by the primary monitor. The handling policy is that when a monitored object runs abnormally or its quality of service is non-qualified, an application or a service on the monitored object is re-scheduled according to a physical machine resource on which the monitored object is located or a network resource on which the physical machine is located. For example, when the monitored object is a container, an application or a service on a container is allocated to one or more other containers. The one or more containers may include a container located on a physical machine different from that of the monitored object. The scheduler module is similar to the manager module or the primary monitor module, and may be one or more processes or threads. It should be noted that, the scheduler is named in terms of function. In implementations of some cases, the manager or the primary monitor may also support a scheduler function, and the manager or the primary monitor supporting the scheduler function is the scheduler in this embodiment of the present invention from another perspective. That is, the manager and the scheduler, or the primary monitor, the manager, and the scheduler may be a same module. Specifically, the module may include one or more threads (or processes), and may be in the service environment (for example, be on a physical machine the same as or different from that of a to-be-handled monitored object), or may be in the management environment, for example, be on a management server (or referred to as a gateway, a scheduling server, or the like). This optional step describes a case in which the scheduler is located in the service environment or the management environment. The case is more suitable for globally scheduling a network resource. A specific implementation manner of re-deploying a monitored object by using the scheduler is not limited in this embodiment of the present invention.

In another aspect, a user may further modify or optimize a handling policy by using the primary monitor, for example, according to the configuration information and the monitoring information received by the primary monitor. Furthermore, the primary monitor may further send the modified or optimized handling policy to a physical machine in the management environment (for example, the management server) by using an output unit, so that the physical machine in the management environment updates the stored original handling policy. The physical machine sends the handling policy part to the management server, and the management server may perform modification, replacement, or addition on the handling policy in the management server according to the handling policy part. In this way, the handling policy in the management server can be updated and modified. The modification and update are made by the monitor according to an actual service status. Therefore, accuracy and compliance with scenarios are ensured.

Figure 6:
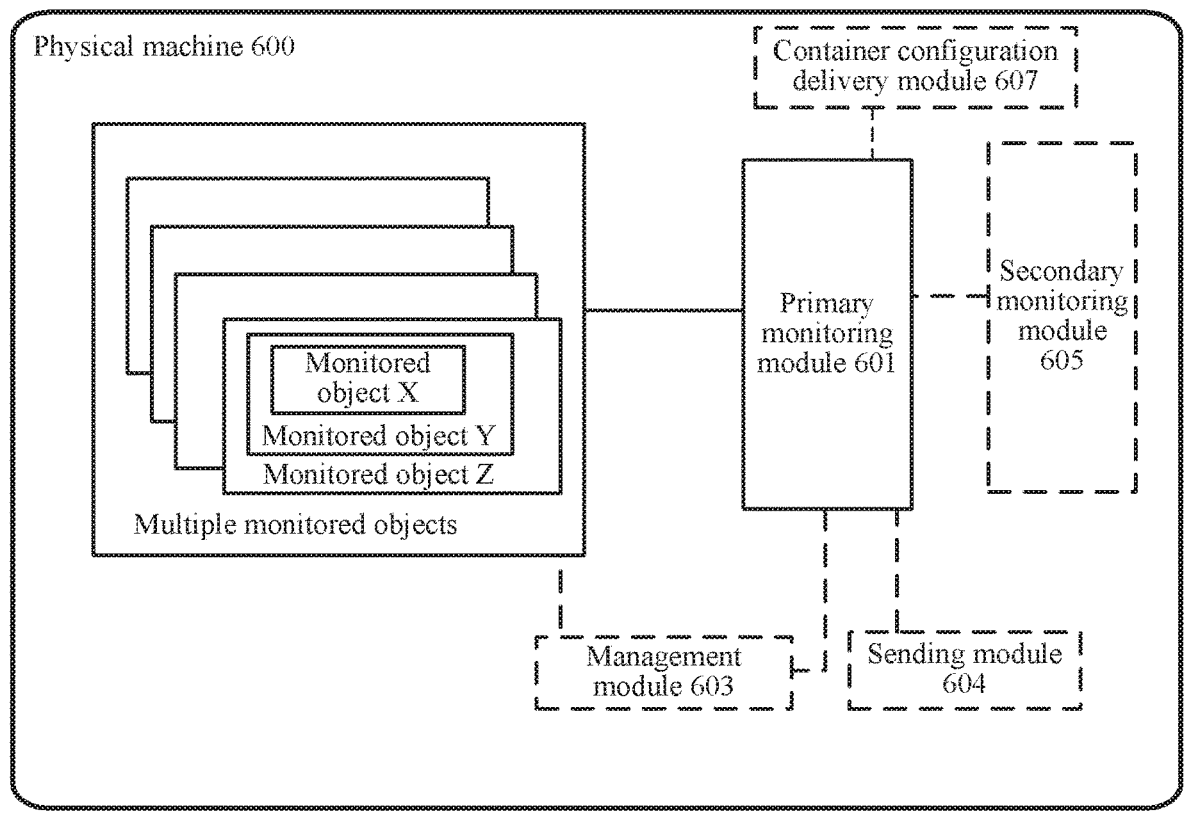
FIG. 6 is a schematic structural diagram of another physical machine according to an embodiment of the present invention.

It should be noted that, explanations and descriptions of steps and related terms in the foregoing method embodiment are also applicable to apparatus embodiments (an embodiment of FIG. 6 and the second embodiment corresponding to FIG. 7) corresponding to the method, and are not repeated in the apparatus embodiments of FIG. 6 and FIG. 7.

Optionally, the two container monitoring methods mentioned above further includes:

when the primary monitor fails to receive heartbeat information of the secondary monitor in a first configured duration, triggering, by the primary monitor, the secondary monitor to exit a running state so that the secondary monitor is restarted, where the heartbeat information of the secondary monitor indicates that the secondary monitor runs normally in a time period; and a secondary monitor further runs on the operating system, and when the secondary monitor fails to receive heartbeat information of the primary monitor in a second configured duration, triggering, by the secondary monitor, the primary monitor to exit a running state, and taking over the monitored objects as a current primary monitor, where the physical machine on which the primary monitor is located restarts the primary monitor so that the primary monitor is used as a current secondary monitor, and the heartbeat information of the primary monitor indicates that the primary monitor runs normally in a time period.

It should be noted that, the heartbeat information mentioned herein of the primary monitor and the secondary monitor is similar to the heartbeat information reported by the monitored objects that is mentioned above. For specific descriptions and forms of the heartbeat information of the primary monitor and the secondary monitor in another specific implementation manner, refer to the description of the heartbeat information reported by the monitored objects. Details are not described again herein. That is, in another implementation manner, when running is abnormal, heartbeat information can still be reported. In this case, the primary monitor (or the secondary monitor) may determine, according to a reporting status of heartbeat information, whether a running status of the secondary monitor (or the primary monitor) reporting the heartbeat information is abnormal, and when running is abnormal, handling is performed according to a step (exchange between the primary monitor and the secondary monitor or restarting) in the foregoing implementation manner.

The step can better ensure that there is a monitor running normally and can ensure monitoring on the monitored objects. Specifically, it is ensured that at least two monitors run in this scenario in this embodiment as a primary monitor and a secondary monitor, and the primary and secondary monitors detect existence of each other, and complete state exchange between the two monitors according to a requirement. In an implementation manner:

If the primary monitor fails to receive heartbeat information of the secondary monitor in a configured duration (corresponding to the first configured duration, for example, 5 ms), it indicates that the secondary monitor fails or is faulty. The primary monitor may trigger the secondary monitor to exit A parent process (for example, a Linux init process or another process) of the secondary monitor restarts the secondary monitor when detecting that the secondary monitor exits. Further, if a quantity of times that the secondary monitor is restarted within a given duration exceeds a threshold, the host is reset. The configured duration, the given duration, and the threshold may be stored in advance, input by a user, or obtained from a module such as the container configuration deliverer. This is not limited in this embodiment of the present invention.

If the secondary monitor fails to receive heartbeat information of the primary monitor in a configured duration, it indicates that the primary monitor fails or is faulty. (The configured duration corresponds to the second configured duration, and may be the same as or different from the first configured duration. The duration may be stored in advance, input by a user, or obtained from a module such as the container configuration deliverer. This is not limited in this embodiment of the present invention.) The secondary monitor may trigger the primary monitor to exit, and set its state to "primary", that is, the secondary monitor takes over monitoring on the monitored objects, and the original secondary monitor is a current primary monitor. A parent process (for example, a Linux init process or another process) of the original primary monitor restarts the original primary monitor when detecting that the original primary monitor exits, and sets its state to "secondary", that is, the original primary monitor is a current secondary monitor. Further, if a quantity of times of exchange between the primary and secondary monitors in a given duration exceeds a threshold, the host is reset. The configured duration, the given duration, and the threshold may be stored in advance, input by a user, or obtained from a module such as the container configuration deliverer. This is not limited in this embodiment of the present invention. For sources about given durations and thresholds in this specification, refer to the descriptions herein. Description is not repeatedly made in other parts.

With the foregoing primary and secondary monitors disposed, it is ensured that there is a monitor running normally and monitoring on the monitored objects can be ensured. Therefore, monitor stability is improved, and the container monitoring solution is more complete and comprehensive.

It should be noted that, explanations and descriptions of steps and related terms in the foregoing method embodiment are also applicable to apparatus embodiments (an embodiment of FIG. 6 and the second embodiment corresponding to FIG. 7) corresponding to the method, and are not repeated in the apparatus embodiments of FIG. 6 and the apparatus embodiment corresponding to FIG. 7.

In conclusion, the monitoring method in the foregoing embodiment is applied to a physical machine. The primary monitor determines service statuses of multiple monitored objects according to execution information of specified instructions. The multiple monitored objects include at least one of a container type, a process-in-container type, or a thread-in-container type. Each of the multiple monitored objects has a unique identifier. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to increasing intensive container distribution scenarios. Further, the primary monitor may perform some operations on the multiple monitored objects according to configuration information about the multiple monitored objects, so that the monitored objects report monitoring information to the primary monitors, and the primary monitor enables a manager to process a monitored object whose quality of service status is abnormal. In this way, a complete set of solution for improving reliability and serviceability of a lightweight virtualization container technology is provided, and a requirement for customized fine-grained monitoring and abnormality handling in the application scenario can be better met.

FIG. 5 is a schematic structural diagram of a physical machine 500 according to an embodiment of the present invention.

The physical machine 500 includes a receiving module 501 and a primary monitoring module 503. Multiple monitored objects run on the physical machine 500. The receiving module 501 is configured to provide a channel for reporting monitoring information by the multiple monitored objects. The channel is used by the multiple monitored objects to report the monitoring information to the primary monitoring module 503. The primary monitoring module 503 is configured to receive the monitoring information via the receiving module 501. Monitoring information of monitored objects of a same type in the multiple monitored objects is reported by using a same channel. The multiple monitored objects include at least one of a container type, a process-in-container type, or a thread-in-container type. Each of the multiple monitored objects has a unique identifier. Monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report.

The primary monitoring module 503 is further configured to determine respective service statuses of the multiple monitored objects according to the monitoring information of the multiple monitored objects and identifiers of the multiple monitored objects.

For example, as shown in FIG. 5, the multiple monitored objects may include a monitored object L (for example, a thread), a monitored object M (for example, a process), a monitored object N (for example, a container), and the like, and may further include an unmarked associated monitored object. FIG. 5 shows only an example.

The physical machine 500 may monitor service statuses of multiple types of monitored objects running on the physical machine 500. The primary monitoring module 503 pushes respective monitoring information reporting manners of multiple monitored objects to the multiple monitored objects, where the multiple monitored objects include at least one of a container type, a process-in-container type, or a thread-in-container type; and determines service statuses of the multiple monitored objects according to monitoring information reported by the multiple monitored objects. In this procedure, monitored objects of a same type report monitoring information by using a same channel. This reduces resources consumed during monitoring in the prior art, and resolves a problem in the prior art that a requirement for multidimensional monitoring on a container cannot be met because only coarse-grained monitoring can be performed on a container due to high resource consumption. The container may be monitored in multiple dimensions including the container, a process in the container, and a thread in the container, and such multidimensional monitoring is also applicable to an intensive container deployment scenario. Further, in the aspect of determining respective service statuses of the multiple monitored objects according to the monitoring information of the multiple monitored objects and identifiers of the multiple monitored objects, the primary monitoring module 503 is configured to determine, according to a correspondence between data zones in which the monitoring information of the multiple monitored objects is located and the identifiers of the multiple monitored objects, the respective service statuses of the multiple monitored objects reporting the monitoring information, where the data zones are data zones of the multiple monitored objects reporting the monitoring information, and the data zones include at least one of a heap type or a stack type.

Specifically, the channel is a communication connection between files or processes.

Optionally, the channel is a Proc file system, and in the aspect of receiving, via the receiving module 501, the monitoring information, the primary monitoring module 503 is configured to receive, via the receiving module 501, the respective monitoring information that is reported by the multiple monitored objects by using one or more files in the Proc file system, where monitored objects of a same type in the multiple monitored objects share a same file in the Proc file system for reporting the monitoring information.

Optionally, the channel is a device file, and in the aspect of receiving, via the receiving module 501, the monitoring information, the primary monitoring module 503 is configured to receive, via the receiving module 501, the respective monitoring information that is reported by the multiple monitored objects by using one or more device files, where monitored objects of a same type in the multiple monitored objects share a same device file for reporting the monitoring information.

Optionally, the channel is a socket communication connection, and in the aspect of receiving, via the receiving module 501, the monitoring information, the primary monitoring module 503 is configured to receive, via the receiving module 501, the respective monitoring information that is reported by the multiple monitored objects by using one or more socket communication connections, where monitored objects of a same type in the multiple monitored objects share a same socket communication connection address for reporting the monitoring information.

Optionally, the channel is an inter-process communication IPC channel, the multiple monitored objects include at least one of a thread type or a process type, a container in which each of the multiple monitored objects is located includes a monitoring thread, and in the aspect of receiving, via the receiving module 501, the monitoring information, the primary monitoring module 503 is configured to receive, via the receiving module 501, the monitoring information that is reported by the multiple monitored objects by using respective corresponding monitoring threads, where monitored objects of a same type in the multiple monitored objects share a same IPC channel for communication with the primary monitoring module to report the monitoring information.

Optionally, the monitoring information is the heartbeat information, and the monitoring module 503 is further configured to determine configuration information of the multiple monitored objects, where the configuration information of the multiple monitored objects includes identity information, heartbeat information reporting manners, and heartbeat periods of the multiple monitored objects, the identity information of the multiple monitored objects includes the identifiers of the multiple monitored objects, the heartbeat information reporting manners indicate types of the channels, and the heartbeat periods indicate time intervals for reporting heartbeat information by the monitored objects during normal running; and the primary monitoring module 503 is further configured to push the respective heartbeat information reporting manners to the multiple monitored objects, where the multiple monitored objects are determined according to the identifiers in the identity information;

correspondingly, in the aspect of receiving, via the receiving module 501, the monitoring information, the primary monitoring module 503 is configured to receive, via the receiving module 501, heartbeat information respectively reported by the multiple monitored objects, where the heartbeat information is reported according to the respective corresponding heartbeat information reporting manners; and correspondingly, in the aspect of determining respective service statuses of the multiple monitored objects according to the monitoring information of the multiple monitored objects and identifiers of the multiple monitored objects, the primary monitoring module 503 is configured to determine respective running statuses of the multiple monitored objects according to the heartbeat periods and the heartbeat information of the multiple monitored objects.

Further, the configuration information of the multiple monitored objects further includes handling policies for abnormal running of the multiple monitored objects, the identity information further includes at least one of a subordination relationship or a cooperation relationship of the multiple monitored objects, and the physical machine further includes a management module 505;

the primary monitoring module 503 is further configured to determine, according to the handling policies for abnormal running, a handling action on a monitored object running abnormally in the multiple monitored objects and an associated monitored object, where a subordination relationship or a cooperation relationship exists between the associated monitored object and at least one of the monitored object running abnormally; and the management module 505 is configured to process the monitored object running abnormally in the multiple monitored objects and the associated monitored object according to the identity information and the handling action.

Optionally, the monitoring information is the quality of service report, and correspondingly, the primary monitoring module 503 is further configured to determine configuration information of the multiple monitored objects, where the configuration information of the multiple monitored objects includes identity information, quality of service report reporting manners, and quality of service requirements of the multiple monitored objects, the identity information of the multiple monitored objects includes the identifiers of the multiple monitored objects, the quality of service report reporting manners indicate types of the channels, and the quality of service requirements are used to determine whether QoS of applications carried on the multiple monitored objects is qualified; and the primary monitoring module 503 is further configured to push the respective quality of service report reporting manners to the multiple monitored objects, where the multiple monitored objects are determined according to the identifiers in the identity information;

correspondingly, in the aspect of receiving, via the receiving module 501, the monitoring information, the primary monitoring module 503 is configured to obtain, via the receiving module 501, quality of service reports respectively reported by the multiple monitored objects, where the quality of service reports are reported according to the respective corresponding quality of service report reporting manners; and correspondingly, in the aspect of determining respective service statuses of the multiple monitored objects according to the monitoring information of the multiple monitored objects and identifiers of the multiple monitored objects, the primary monitoring module 503 is configured to determine, according to the quality of service requirements and the quality of service reports of the multiple monitored objects, whether the quality of service of applications respectively carried on the multiple monitored objects is qualified.

Further, the configuration information of the multiple monitored objects further includes handling policies for non-qualified quality of service, the identity information further includes at least one of a subordination relationship or a cooperation relationship of the multiple monitored objects, and the physical machine further includes a management module 505;

the primary monitoring module 503 is further configured to determine, according to the handling policies for non-qualified quality of service, a handling action on a monitored object whose quality of service is non-qualified in the multiple monitored objects and an associated monitored object, where a subordination relationship or a cooperation relationship exists between the associated monitored object and at least one of the monitored object whose quality of service is non-qualified; and the management module 505 is configured to process the monitored object whose quality of service is non-qualified in the multiple monitored objects and the associated monitored object according to the identity information and the handling action.

It should be noted that, the monitoring information may alternatively include the heartbeat information and the quality of service report. For a corresponding step performed by the primary monitoring module 503 and content of configuration information in this case, refer to cases in which the heartbeat information and the quality of service report are separately described. Details are not described again herein.

Optionally, the physical machine further includes a sending module 506. The sending module 506 is configured to send a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitoring module according to the service statuses of the multiple monitored objects and handling policies for abnormal service statuses.

Optionally, the physical machine further includes a secondary monitoring module 507;

the primary monitoring module 503 is further configured to: when the primary monitoring module fails to receive heartbeat information of the secondary monitoring module 507 in a first configured duration, trigger the secondary monitoring module 507 to exit a running state so that the secondary monitoring module is restarted, where the heartbeat information of the secondary monitoring module 507 indicates that the secondary monitoring module 507 runs normally in a time period; and when the secondary monitoring module 507 fails to receive heartbeat information of the primary monitoring module 503 in a second configured duration, the secondary monitoring module 507 triggers the primary monitoring module 503 to exit a running state, and takes over the monitored objects as a current primary monitoring module 503, where the physical machine on which the primary monitoring module 503 is located restarts the primary monitoring module 503 so that the primary monitoring module 503 is used as a current secondary monitoring module 507, and the heartbeat information of the primary monitoring module 503 indicates that the primary monitoring module 503 runs normally in a time period.

Optionally, the physical machine 500 may further include a container configuration delivery module 509, configured to deliver the configuration information of the multiple monitored objects to the primary monitoring module 503. For descriptions related to the container configuration deliverer 509 and the configuration information, refer to corresponding method embodiments. It should be noted that, modules represented by dashed line blocks in FIG. 5 are all optional modules.

It should be noted that, for explanations and descriptions of content in FIG. 5 and the first apparatus embodiment corresponding to FIG. 7 below, refer to related descriptions in corresponding method embodiments (corresponding to FIG. 2 to FIG. 4). Details are not described again herein. In another aspect, connection relationships between constituent parts in FIG. 5 are merely an example for description, and do not constitute a limitation to embodiments.

The physical machine corresponding to FIG. 5 may monitor service statuses of multiple types of monitored objects running on the physical machine, and process, according to a handling policy, a monitored object whose quality of service status is abnormal in the monitored objects. The primary monitoring module pushes respective monitoring information reporting manners of multiple monitored objects to the multiple monitored objects. The multiple monitored objects include at least one of a container type, a process-in-container type, or a thread-in-container type. Each of the multiple monitored objects has a unique identifier. Monitored objects of a same type report monitoring information by using a same channel. This greatly reduces resources (for example, quantities of threads and socket ports) consumed during monitoring in the prior art, and resolves a problem in the prior art that a requirement for multidimensional monitoring on a container cannot be met because only coarse-grained monitoring can be performed on a container due to high resource consumption. The container may be monitored in multiple dimensions including the container, a process in the container, and a thread in the container, and such multidimensional monitoring is also applicable to an intensive container deployment scenario. Further, the primary monitor may perform some operations on the multiple monitored objects according to configuration information about the multiple monitored objects, so that the monitored objects report monitoring information to the primary monitors, and the primary monitor enables a manager to process a monitored object Whose quality of service status is abnormal. In this way, a complete set of solution for improving reliability and serviceability of a lightweight virtualization container technology is provided, and a requirement for customized fine-grained monitoring and abnormality handling in the application scenario can be better met.

FIG. 6 is a schematic apparatus diagram of another physical machine 600 according to an embodiment of the present invention. Multiple monitored objects run on the physical machine. The physical machine includes a primary monitoring module 601. The primary monitoring module 601 is configured to determine service statuses of the multiple monitored objects by detecting information about execution of instructions by the multiple monitored objects. The instruction includes a specified address, and the service status includes at least one of a running status or quality of service.

Specifically, each of the multiple monitored objects has a unique identifier, and in the aspect of determining, by the primary monitoring module 601, service statuses of the multiple monitored objects by detecting information about execution of instructions by the multiple monitored objects, the primary monitoring module 601 is configured to determine the respective service statuses of the multiple monitored objects according to a correspondence between data zones in which the execution information of the instructions is stored and identifiers of the multiple monitored objects, where the data zones are data zones of the multiple monitored objects reporting the monitoring information, and the data zones include at least one of a heap type or a stack type.

For example, as shown in FIG. 6, the multiple monitored objects may include a monitored object X (for example, a thread), a monitored object Y (for example, a process), a monitored object Z (for example, a container), and the like, and may further include an unmarked associated monitored object. FIG. 6 shows only an example.

The physical machine 600 may monitor service statuses of multiple types of monitored objects running on the physical machine 600. The primary monitoring module 601 determines service statuses of multiple monitored objects according to execution information of specified instructions. The multiple monitored objects include at least one of a container type, a process-in-container type, or a thread-in-container type. This greatly reduces quantities of threads and socket ports consumed during monitoring in the prior art, and resolves a problem in the prior art that a container monitoring requirement cannot be met because only coarse-grained monitoring can be performed on a container for the sake of thread and port resources. The container may be monitored in multiple dimensions including the container, a process in the container, and a thread in the container, and such multidimensional monitoring is also applicable to a current intensive container distribution scenario.

Optionally, when the service status is the running status, the physical machine 600 further includes a management module 603. Where the primary monitoring module 601 is configured to determine identity information of the multiple monitored objects and handling policies for abnormal running, where the identity information of the multiple monitored objects includes at least one of a subordination relationship or a cooperation relationship of the multiple monitored objects and the identifiers of the multiple monitored objects;

the primary monitoring module 601 is configured to determine a handling action on a monitored object running abnormally and an associated monitored object according to the identity information and running statuses of multiple monitored objects and the handling policies for abnormal running, where a subordination relationship or a cooperation relationship exists between the associated monitored object and at least one of the monitored object running abnormally; and the management module 603 is configured to process the monitored object running abnormally in the multiple monitored objects and the associated monitored object according to the handling action.

Optionally, when the service status is the quality of service, the physical machine 600 further includes a management module 603. The method further includes:

the primary monitoring module 601 is configured to determine identity information of the multiple monitored objects and handling policies for non-qualified quality of service, where the identity information of the multiple monitored objects includes at least one of a subordination relationship or a cooperation relationship of the multiple monitored objects and the identifiers of the multiple monitored objects;

the primary monitoring module 601 is configured to determine a handling action on a monitored object whose quality of service is non-qualified and an associated monitored object according to the identity information and quality of service of multiple monitored objects and the handling policies for non-qualified quality of service, where a subordination relationship or a cooperation relationship exists between the associated monitored object and at least one of the monitored object whose quality of service is non-qualified; and the management module 603 is configured to process the monitored object whose quality of service is non-qualified in the multiple monitored objects and the associated monitored object according to the handling action.

Optionally, the physical machine 600 further includes a sending module 604. The sending module 604 is configured to send a handling instruction to a management server, where the handling instruction includes a handling action and an identifier of a to-be-handled monitored object, the handling instruction is used by the management server to deploy an application corresponding to the to-be-handled monitored object onto at least one other physical machine, and the handling action is determined by the primary monitoring module 601 according to the service statuses of the multiple monitored objects and handling policies for abnormal service statuses.

Optionally, the physical machine 600 further includes a secondary monitoring module 605. The primary monitoring module 601 is further configured to: when the primary monitoring module 601 fails to receive heartbeat information of the secondary monitoring module 605 in a first configured duration, trigger the secondary monitoring module 605 to exit a running state so that the physical machine 600 restarts the secondary monitoring module 605, where the heartbeat information of the secondary monitoring module 605 indicates that the secondary monitoring module 605 runs normally in a period of time; and the secondary monitoring module 605 is configured to: when the secondary monitoring module 605 fails to receive heartbeat information of the primary monitoring module 601 in a second configured duration, trigger the primary monitoring module 601 to exit a running state, and take over the monitored objects as a current primary monitoring module 601, where the physical machine 600 restarts the primary monitoring module 601 so that the primary monitoring module 601 is used as a current secondary monitoring module 605, and the heartbeat information of the primary monitoring module 601 indicates that the primary monitoring module 601 runs normally in a period of time.

Optionally, the physical machine 600 may further include a container configuration delivery module 607, configured to deliver configuration information of the multiple monitored objects to the primary monitoring module 601. For descriptions related to the container configuration delivery module 607 and the configuration information, refer to corresponding method embodiments. It should be noted that, modules represented by dashed line blocks in FIG. 6 are all optional modules.

It should be noted that, the modules mentioned in the embodiments corresponding to FIG. 5 and FIG. 6 are divided merely according to logical functions and may be divided in another manner in an actual implementation. For example, multiple modules may be combined or integrated into one module, for example, one or more threads or processes that can implement corresponding functions, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

It should be noted that, for explanations and descriptions of content in FIG. 6 and the second apparatus embodiment corresponding to FIG. 7, refer to related descriptions in corresponding method embodiments. Details are not described again herein. In another aspect, connection relationships between constituent parts in FIG. 6 are merely an example for description, and do not constitute a limitation to embodiments.

In the physical machine 600 in the foregoing embodiment corresponding to FIG. 6, the primary monitor determines service statuses of multiple monitored objects according to execution information of specified instructions. The multiple monitored objects include at least one of a container type, a process-in-container type, or a thread-in-container type. Each of the multiple monitored objects has a unique identifier. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to a current intensive container distribution scenario. Further, the primary monitor may perform some operations on the multiple monitored objects according to configuration information about the multiple monitored objects, so that the monitored objects report monitoring information to the primary monitors, and the primary monitor enables a manager to process a monitored object whose quality of service status is abnormal. In this way, a complete set of solution for improving reliability and serviceability of a lightweight virtualization container technology is provided, and a requirement for customized fine-grained monitoring and abnormality handling in the application scenario can be better met.

FIG. 7 is a schematic structural diagram of still another physical machine according to an embodiment of the present invention. The physical machine may be a server, a personal computer (PC), or the like. The physical machine 700 may include a hardware layer, and may specifically include an input/output (I/O, Input/Output) device 701 (for example, a network interface card), a processor 702, a storage 703, and a bus 705. Specifically, the processor 702 may have multiple cores. The physical machine 700 also includes an operating system OS running above the hardware layer. Multiple monitored objects and a primary monitor run on the OS. The multiple monitored objects include at least one of a container type, a process-in-container type, or a thread-in-container type. Optionally, at least one of a manager or a secondary monitor runs on the OS.

The storage 703 may include a read-only memory and a random access memory, and provide an instruction and data for the processor 702. A part of the storage 703 may further include a non-volatile random access memory (NVRAM).

The storage 703 stores the following elements, executable modules, or data structures, or a subset thereof, or an extended set thereof:

operation instructions, including various operation instructions, used to implement various operations; and the operating system, including various system programs, used to implement various fundamental services and process hardware-based tasks.

For example, to ensure hardware compatibility, in some implementation manners, one or more of a monitored object, a primary monitor, a secondary monitor, a manager, or a container configuration deliverer mentioned below may be installed on a virtual machine. Certainly, in some other implementation manners, one or more of the monitored object, the primary monitor, the secondary monitor, the manager, or the container configuration deliverer mentioned below may be installed on a host machine. This is not limited in this embodiment of the present invention. In addition, the primary monitor, the secondary monitor, the manager, and the container configuration deliverer mentioned above all may be understood as threads or processes of the physical machine in the embodiment of FIG. 7. Their data is stored in the storage 703, and the processor 702 calls the data to execute instructions corresponding to the threads or processes.

As a management layer, a host machine 7031 is configured to manage and allocate a hardware resource, present a virtual hardware platform for a virtual machine, and implement virtual machine scheduling and isolation. The host may be a virtual machine monitor (VMM). Alternatively, a VMM cooperates with a privilege virtual machine sometimes, and the two are combined into a host. The virtual hardware platform provides hardware resources, such as a virtual processor, a memory, a virtual disk, and a virtual network interface card, for virtual machines running on the virtual hardware platform. The virtual disk may correspond to a file or a logical block device of the host. The virtual machine runs on the virtual hardware platform that is prepared by the host for the virtual machine. One or more virtual machines run on the host.

Virtual machine 7032: One or more virtualized machines may be simulated on one physical machine by using virtual machine software. The virtual machines work like real physical machines. Operating systems and application programs may be installed on the virtual machines. The virtual machines may further access a network resource. For the application programs running in the virtual machines, the virtual machines look like working on real physical machines.

In an embodiment corresponding to FIG. 7, the processor 702 calls an operation instruction stored in the storage 703 (the operation instruction may be stored in the operating system), so that the primary monitor performs the following operations:

obtaining monitoring information respectively reported by the multiple monitored objects, where monitoring information of monitored objects of a same type in the multiple monitored objects is reported by using a same channel, each of the multiple monitored objects has a unique identifier, monitoring information of each monitored object includes at least one of heartbeat information or a quality of service report, the heartbeat information indicates a running status in a heartbeat period, of the monitored object reporting the heartbeat information, and the quality of service report is used to record quality of service QoS of an application carried on the monitored object reporting the quality of service report; and determining respective service statuses of the multiple monitored objects according to the monitoring information of the multiple monitored objects and identifiers of the multiple monitored objects.

It should be noted that, this embodiment may be considered as a specific implementation manner of the embodiment corresponding to FIG. 5. The primary monitoring module, the receiving module, the management module, and the secondary monitoring module are implemented by the processor 702 by invoking operation instructions stored in the storage 703. A hardware part of the sending module corresponds to the I/O device 701, and the processor 702 calls a related operation instruction stored in the storage 703 to implement a function of the sending module.

Optionally, in the aspect of determining, by the primary monitor, respective service statuses of the multiple monitored objects according to the monitoring information of the multiple monitored objects and identifiers of the multiple monitored objects, the processor 702 may call an operation instruction stored in the storage 703 (the operation instruction may be stored in the operating system), so that the primary monitor performs the following operation: determining, according to a correspondence between data zones in which the monitoring information of the multiple monitored objects is located and the identifiers of the multiple monitored objects, the respective service statuses of the multiple monitored objects reporting the monitoring information, where the data zones are data zones of the multiple monitored objects reporting the monitoring information, and the data zones include at least one of a heap type or a stack type.

Specifically, the channel is a communication connection between files or processes.

Optionally, the channel is a Proc file system, and in the aspect of obtaining monitoring information respectively reported by the multiple monitored objects, the processor 702 may call an operation instruction stored in the storage 703 (the operation instruction may be stored in the operating system), so that the primary monitor performs the following operation: receiving the respective monitoring information that is reported by the multiple monitored objects by using one or more files in the Proc file system, where monitored objects of a same type in the multiple monitored objects share a same file in the Proc file system for reporting the monitoring information.

Optionally, the channel is a device file, and in the aspect of obtaining monitoring information respectively reported by the multiple monitored objects, the processor 702 may call an operation instruction stored in the storage 703 (the operation instruction may be stored in the operating system), so that the primary monitor performs the following operation: receiving the respective monitoring information that is reported by the multiple monitored objects by using one or more device files, where monitored objects of a same type in the multiple monitored objects share a same device file for reporting the monitoring information.

Optionally, the channel is a socket communication connection, and in the aspect of obtaining monitoring information respectively reported by the multiple monitored objects, the processor 702 may call an operation instruction stored in the storage 703 (the operation instruction may be stored in the operating system), so that the primary monitor performs the following operation: receiving the respective monitoring information that is reported by the multiple monitored objects by using one or more socket communication connections, where monitored objects of a same type in the multiple monitored objects share a same socket communication connection address for reporting the monitoring information.

Optionally, the channel is an inter-process communication IPC channel, the multiple monitored objects include at least one of a thread type or a process type, a container in which each of the multiple monitored objects is located includes a monitoring thread, and in the aspect of obtaining monitoring information respectively reported by the multiple monitored objects, the processor 702 may call an operation instruction stored in the storage 703 (the operation instruction may be stored in the operating system), so that the primary monitor performs the following operation: receiving the monitoring information that is reported by the multiple monitored objects by using respective corresponding monitoring threads, where monitored objects of a same type in the multiple monitored objects share a same IPC channel for communication with the primary monitor to report the monitoring information.

Optionally, the monitoring information is the heartbeat information, and the processor 702 may call an operation instruction stored in the storage 703 (the operation instruction may be stored in the operating system), so that the primary monitor performs the following operations: determining configuration information of the multiple monitored objects, where the configuration information of the multiple monitored objects includes identity information, heartbeat information reporting manners, and heartbeat periods of the multiple monitored objects, the identity information of the multiple monitored objects includes the identifiers of the multiple monitored objects, the heartbeat information reporting manners indicate types of the channels, and the heartbeat periods indicate time intervals for reporting heartbeat information by the monitored objects during normal running; and pushing the respective heartbeat information reporting manners to the multiple monitored objects, where the multiple monitored objects are determined according to the identifiers in the identity information;

correspondingly, in the aspect of obtaining monitoring information respectively reported by the multiple monitored objects, the processor 702 may call an operation instruction stored in the storage 703 (the operation instruction may be stored in the operating system), so that the primary monitor performs the following operation: obtaining heartbeat information respectively reported by the multiple monitored objects, where the heartbeat information is reported according to the respective corresponding heartbeat information reporting manners; and correspondingly, in the aspect of determining respective service statuses of the multiple monitored objects according to the monitoring information of the multiple monitored objects and identifiers of the multiple monitored objects, the processor 702 may call an operation instruction stored in the storage 703 (the operation instruction may be stored in the operating system), so that the primary monitor performs the following operation: determining respective running statuses of the multiple monitored objects according to the heartbeat periods and the heartbeat information of the multiple monitored objects.

Further, the configuration information of the multiple monitored objects further includes handling policies for abnormal running of the multiple monitored objects, the identity information further includes at least one of a subordination relationship or a cooperation relationship of the multiple monitored objects, and a manager further runs on the operating system; and the processor 702 may call an operation instruction stored in the storage 703 (the operation instruction may be stored on the operating system), so that the primary monitor performs the following operation: determining, according to the handling policies for abnormal running, a handling action on a monitored object running abnormally in the multiple monitored objects and an associated monitored object, and a subordination relationship or a cooperation relationship exists between the associated monitored object and at least one of the monitored object running abnormally; and the manager on the operating system performs the following operation: handling the monitored object running abnormally in the multiple monitored objects and the associated monitored object according to the identity information and the handling action.

In another aspect, the monitoring information is the quality of service report, and the processor 702 may call an operation instruction stored in the storage 703 (the operation instruction may be stored in the operating system), so that the primary monitor performs the following operations: determining configuration information of the multiple monitored objects, where the configuration information of the multiple monitored objects includes identity information, quality of service report reporting manners, and quality of service requirements of the multiple monitored objects, the identity information of the multiple monitored objects includes the identifiers of the multiple monitored objects, the quality of service report reporting manners indicate types of the channels, and the quality of service requirements are used to determine whether QoS of applications carried on the multiple monitored objects is qualified; and pushing the respective quality of service report reporting manners to the multiple monitored objects, where the multiple monitored objects are determined according to the identifiers in the identity information;

correspondingly, in the aspect of obtaining monitoring information respectively reported by the multiple monitored objects, the processor 702 may call an operation instruction stored in the storage 703 (the operation instruction may be stored in the operating system), so that the primary monitor performs the following operation: obtaining quality of service reports respectively reported by the multiple monitored objects, where the quality of service reports are reported according to the respective corresponding quality of service report reporting manners; and correspondingly, in the aspect of determining respective service statuses of the multiple monitored objects according to the monitoring information of the multiple monitored objects and identifiers of the multiple monitored objects, the processor 702 may call an operation instruction stored in the storage 703 (the operation instruction may be stored in the operating system), so that the primary monitor performs the following operation: determining, according to the quality of service requirements and the quality of service reports of the multiple monitored objects, whether the quality of service of applications respectively carried on the multiple monitored objects is qualified.

Further, the configuration information of the multiple monitored objects further includes handling policies for non-qualified quality of service, and the identity information further includes at least one of a subordination relationship or a cooperation relationship of the multiple monitored objects; and the processor 702 may call an operation instruction stored in the storage 703 (the operation instruction may be stored in the operating system), so that the primary monitor performs the following operation: determining, according to the handling policies for non-qualified quality of service, a handling action on a monitored object whose quality of service is non-qualified in the multiple monitored objects and an associated monitored object, where a subordination relationship or a cooperation relationship exists between the associated monitored object and at least one of the monitored object whose quality of service is non-qualified; and a manager further runs on the operating system, and the processor 702 may call an operation instruction stored in the storage 703 (the operation instruction may be stored in the operating system), so that the primary monitor performs the following operation: handling the monitored object whose quality of service is non-qualified in the multiple monitored objects and the associated monitored object according to the identity information and the handling action.

The I/O device is configured to send a handling instruction to a management server, where the handling instruction includes a handling action and an identifier of a to-be-handled monitored object, the handling instruction is used by the management server to deploy an application carried on the to-be-handled monitored object onto at least one other physical machine, and the handling action is determined by the primary monitor according to the service statuses of the multiple monitored objects and handling policies for abnormal service statuses.

Optionally, the processor 702 may call an operation instruction stored in the storage 703 (the operation instruction may be stored in the operating system), so that the primary monitor performs the following operation: when the primary monitor fails to receive heartbeat information of the secondary monitor in a first configured duration, triggering the secondary monitor to exit a running state so that the secondary monitor is restarted, where the heartbeat information of the secondary monitor indicates that the secondary monitor runs normally in a time period; and a secondary monitor further runs on the operating system, and the processor 702 may call an operation instruction stored in the storage 703 (the operation instruction may be stored in the operating system), so that the secondary monitor performs the following operation: when the secondary monitor fails to receive heartbeat information of the primary monitor in a second configured duration, triggering the primary monitor to exit a running state, and taking over the monitored objects as a current primary monitor, where the physical machine on which the primary monitor is located restarts the primary monitor so that the primary monitor is used as a current secondary monitor, and the heartbeat information of the primary monitor indicates that the primary monitor runs normally in a time period.

The physical machine may monitor service statuses of multiple types of monitored objects running on the physical machine, and process, according to a handling policy, a monitored object whose quality of service status is abnormal in the monitored objects. The multiple monitored objects include at least one of a container type, a process-in-container type, or a thread-in-container type. Each of the multiple monitored objects has a unique identifier. Monitored objects of a same type in the multiple monitored objects use a same file mode or channel to report monitoring information. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to a current intensive container distribution scenario. Further, the primary monitor may perform some operations on the multiple monitored objects according to configuration information about the multiple monitored objects, so that the monitored objects report monitoring information to the primary monitors, and the primary monitor enables a manager to process a monitored object whose quality of service status is abnormal. In this way, a complete set of solution for improving reliability and serviceability of a lightweight virtualization container technology is provided, and a requirement for customized fine-grained monitoring and abnormality handling in the application scenario can be better met.

In another embodiment corresponding to FIG. 7, the processor 702 calls an operation instruction stored in the storage 703 (the operation instruction may be stored in the operating system), so that the primary monitor performs the following operation: determining service statuses of the multiple monitored objects by detecting information about execution of instructions by the multiple monitored objects, where the instruction includes a specified address, and the service status includes at least one of a running status or quality of service.

Specifically, each of the multiple monitored objects has a unique identifier, and in the aspect of determining, by the primary monitor, service statuses of the multiple monitored objects by detecting information about execution of instructions by the multiple monitored objects, the processor 702 calls an operation instruction stored in the storage 703 (the operation instruction may be stored in the operating system), so that the primary monitor performs the following operation: determining, by the primary monitor, the respective service statuses of the multiple monitored objects according to a correspondence between data zones in which the execution information of the instructions is stored and identifiers of the multiple monitored objects, where the data zones are data zones of the multiple monitored objects reporting the monitoring information, and the data zones include at least one of a heap type or a stack type.

In the physical machine in this implementation manner, the primary monitor determines service statuses of multiple monitored objects according to execution information of specified instructions. The multiple monitored objects include at least one of a container type, a process-in-container type, or a thread-in-container type. This greatly reduces resources (for example, quantities of threads and socket ports) consumed during monitoring in the prior art, reduces the resources consumed during monitoring in the prior art, and resolves a problem in the prior art that a container monitoring requirement cannot be met because only coarse-grained monitoring can be performed on a container for the sake of thread and port resources. The container may be monitored in multiple dimensions including the container, a process in the container, and a thread in the container, and such multidimensional monitoring is also applicable to an intensive container deployment scenario.

Optionally, when the service status is the running status, the processor 702 may call an operation instruction stored in the storage 703 (the operation instruction may be stored in the operating system), so that the primary monitor performs the following operations: determining identity information of the multiple monitored objects and handling policies for abnormal running, where the identity information of the multiple monitored objects includes at least one of a subordination relationship or a cooperation relationship of the multiple monitored objects and the identifiers of the multiple monitored objects; and determining a handling action on a monitored object running abnormally and an associated monitored object according to the identity information and running statuses of multiple monitored objects and the handling policies for abnormal running, where a subordination relationship or a cooperation relationship exists between the associated monitored object and at least one of the monitored object running abnormally; and a manager further runs on the operating system of the physical machine, and the processor 702 may call an operation instruction stored in the storage 703 (the operation instruction may be stored in the operating system), so that the manager performs the following operation: handling the monitored object running abnormally in the multiple monitored objects and the associated monitored object according to the handling action.

Optionally, when the service status is the quality of service, the processor 702 may call an operation instruction stored in the storage 703 (the operation instruction may be stored in the operating system), so that the primary monitor performs the following operations: determining identity information of the multiple monitored objects and handling policies for non-qualified quality of service, where the identity information of the multiple monitored objects includes at least one of a subordination relationship or a cooperation relationship of the multiple monitored objects and the identifiers of the multiple monitored objects; and determining a handling action on a monitored object whose quality of service is non-qualified and an associated monitored object according to the identity information and quality of service of multiple monitored objects and the handling policies for non-qualified quality of service, where a subordination relationship or a cooperation relationship exists between the associated monitored object and at least one of the monitored object whose quality of service is non-qualified; and a manager further runs on the operating system of the physical machine, and the processor 702 may call an operation instruction stored in the storage 703 (the operation instruction may be stored in the operating system), so that the manager performs the following operation: handling the monitored object whose quality of service is non-qualified in the multiple monitored objects and the associated monitored object according to the handling action.

The I/O device is configured to send a handling instruction to a management server, where the handling instruction includes a handling action and an identifier of a to-be-handled monitored object, the handling instruction is used by the management server to deploy an application carried on the to-be-handled monitored object onto at least one other physical machine, and the handling action is determined by the primary monitor according to the service statuses of the multiple monitored objects and handling policies for abnormal service statuses.

Optionally, the processor 702 may call an operation instruction stored in the storage 703 (the operation instruction may be stored in the operating system), so that the primary monitor performs the following operation: when the primary monitor fails to receive heartbeat information of the secondary monitor in a first configured duration, triggering the secondary monitor to exit a running state so that the secondary monitor is restarted, where the heartbeat information of the secondary monitor indicates that the secondary monitor runs normally in a time period; and a secondary monitor further runs on the operating system, and the processor 702 may call an operation instruction stored in the storage 703 (the operation instruction may be stored in the operating system), so that the secondary monitor performs the following operation: when the secondary monitor fails to receive heartbeat information of the primary monitor in a second configured duration, triggering the primary monitor to exit a running state, and taking over the monitored objects as a current primary monitor, where the physical machine on which the primary monitor is located restarts the primary monitor so that the primary monitor is used as a current secondary monitor, and the heartbeat information of the primary monitor indicates that the primary monitor runs normally in a time period.

The physical machine in the foregoing embodiment determines service statuses of multiple monitored objects according to execution information of specified instructions. The multiple monitored objects include at least one of a container type, a process-in-container type, or a thread-in-container type. Each of the multiple monitored objects has a unique identifier. This greatly reduces resources (for example, quantities of threads and socket ports) consumed during monitoring in the prior art, and resolves a problem in the prior art that a container monitoring requirement cannot be met because only coarse-grained monitoring can be performed on a container for the sake of thread and port resources. A lightweight virtualization system may be monitored in multiple dimensions including a container, a process, a thread, and even a manager and a primary monitor, and such multidimensional monitoring is also applicable to a current intensive container distribution scenario. Further, the primary monitor may perform some operations on the multiple monitored objects according to configuration information about the multiple monitored objects, so that the monitored objects report monitoring information to the primary monitors, and the primary monitor enables a manager to process a monitored object whose quality of service status is abnormal. In this way, a complete set of solution for improving reliability and serviceability of a lightweight virtualization container technology is provided, and a requirement for customized fine-grained monitoring and abnormality handling in the application scenario can be better met.

In the embodiments corresponding to FIG. 7, the processor 702 controls operations of the physical machine 700, and the processor 702 may also be referred to as a CPU (Central Processing Unit, central processing unit). The storage 703 may include a read-only memory and a random access memory, and provide an instruction and data for the processor 702. A part of the storage 703 may further include a non-volatile random access memory (NVRAM). In a specific application, components of the physical machine 700 are coupled together by using the bus system 705, and besides including a data bus, the bus system 705 further includes a power bus, a control bus, and a state signal bus. However, for a purpose of clear description, various types of buses in the figure are all marked as the bus system 705. For convenience of representation, the bus is represented by using only one thick line in FIG. 7. However, it does not indicate that the bus system 705 has only one bus or only one type of bus.

The methods disclosed in the foregoing embodiments of the present invention may be applied to the processor 702, or are implemented by the processor 702. The processor 702 may be an integrated circuit chip and have a signal processing capability. In an implementation process, steps of the foregoing methods may be accomplished by using an integrated logical circuit of hardware in the processor 702 or an instruction in a form of software. The foregoing processor 702 may be a general purpose processor, a digital signal processor (DSP), an application-specific integrated circuit (ASIC), a field programmable gate array (FPGA), or another programmable logical device, discrete gate or transistor logical device, or discrete hardware component. The processor 1902 may implement or execute methods, steps, and logical block diagrams disclosed in the embodiments of the present invention. The general purpose processor may be a microprocessor or the processor may be any conventional processor or the like. Steps of the methods disclosed by using the embodiments of the present invention may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the storage 703, and the processor 702 reads information in the storage 703 and completes the steps of the foregoing methods in combination with hardware of the processor 702.

A person of ordinary skill in the art may understand that all or some of the processes of the methods in the embodiments may be implemented by a physical machine program instructing relevant hardware (such as a processor). The program may be stored in a physical machine readable storage medium. When the program runs, the processes of the methods in the embodiments are performed. The foregoing storage medium may include: a magnetic disk, an optical disc, a read-only memory (ROM), or a random access memory (RAM).

The container monitoring method and apparatus provided in the embodiments of the present invention are described above. The foregoing embodiments are described only to help understand the method and core idea of the present invention. In addition, with respect to the specific implementation manners and application scope, variations may be made by persons of ordinary skill in the art according to the idea of the present invention. In conclusion, content of this specification should not be construed as a limitation to the present invention. Persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A container monitoring method by a physical machine, used to monitor multiple monitored objects running on the physical machine, wherein the multiple monitored objects comprise at least one of a container type, a process-in-container type, or a thread-in-container type, the physical machine comprises a primary monitor, and the monitoring method comprises:
   obtaining, by the primary monitor, monitoring information respectively reported by the multiple monitored objects,
   wherein
   monitoring information of monitored objects of a same type in the multiple monitored objects is reported by using a same channel,
   each of the multiple monitored objects has a unique identifier,
   the monitoring information of each monitored object comprises at least one of heartbeat information or a quality of service report, the heartbeat information indicates a running status in a heartbeat period, of the monitored object reporting the heartbeat information, and the quality of service report is used to record quality of service (QoS) of an application carried on the monitored object reporting the quality of service report; and
   determining, by the primary monitor, respective service statuses of the multiple monitored objects according to the monitoring information of the multiple monitored objects and unique identifiers of the multiple monitored objects.

2. The method according to claim 1, wherein the determining, by the primary monitor, respective service statuses of the multiple monitored objects according to the monitoring information of the multiple monitored objects and the unique identifiers of the multiple monitored objects comprises:
   determining, by the primary monitor according to a correspondence between data zones in which the monitoring information of the multiple monitored objects is located and the unique identifiers of the multiple monitored objects, the respective service statuses of the multiple monitored objects reporting the monitoring information, wherein the data zones are data zones of the multiple monitored objects reporting the monitoring information, and the data zones comprise at least one of a heap type or a stack type.

3. The method according to claim 1, wherein the same channel is a communication connection between files or processes.

4. The method according to claim 3, wherein the same channel is a Proc file system, and the obtaining, by the primary monitor, monitoring information respectively reported by the multiple monitored objects comprises:
   receiving, by the primary monitor, the respective monitoring information that is reported by the multiple monitored objects by using one or more files in the Proc file system, wherein monitored objects of a same type in the multiple monitored objects share a same file in the Proc file system for reporting the monitoring information.

5. The method according to claim 3, wherein the same channel is a device file, and the obtaining, by the primary monitor, monitoring information respectively reported by the multiple monitored objects comprises:
   obtaining, by the primary monitor, the respective monitoring information that is reported by the multiple monitored objects by using one or more device files, wherein monitored objects of a same type in the multiple monitored objects share a same device file for reporting the monitoring information.

6. The method according to claim 3, wherein the same channel is a socket communication connection, and the obtaining, by the primary monitor, monitoring information respectively reported by the multiple monitored objects comprises:
   obtaining, by the primary monitor, the respective monitoring information that is reported by the multiple monitored objects by using one or more socket communication connections, wherein monitored objects of a same type in the multiple monitored objects share a same socket communication connection address for reporting the monitoring information.

7. The method according to claim 3, wherein the same channel is an inter-process communication (IPC) channel, the multiple monitored objects comprise at least one of a thread type or a process type, a container in which each of the multiple monitored objects is located comprises a monitoring thread, and the obtaining, by the primary monitor, monitoring information respectively reported by the multiple monitored objects comprises:
   obtaining, by the primary monitor, the monitoring information that is reported by the multiple monitored objects by using respective corresponding monitoring threads, wherein monitored objects of a same type in the multiple monitored objects share a same IPC channel for communication with the primary monitor to report the monitoring information.

8. A physical machine, comprising:
   a hardware layer and an operating system OS running above the hardware layer,
   wherein multiple monitored objects and a primary monitor run on the OS, the multiple monitored objects comprise at least one of a container type, a process-in-container type, or a thread-in-container type, and
   the primary monitor is configured to obtain monitoring information respectively reported by the multiple monitored objects,
   wherein
   monitoring information of monitored objects of a same type in the multiple monitored objects is reported by using a same channel, each of the multiple monitored objects has a unique identifier, the monitoring information of each monitored object comprises at least one of heartbeat information or a quality of service report, the heartbeat information indicates a running status in a heartbeat period, of the monitored object reporting the heartbeat information, and the quality of service report is used to record quality of service (QoS) of an application carried on the monitored object reporting the quality of service report; and the primary monitor is further configured to determine respective service statuses of the multiple monitored objects according to the monitoring information of the multiple monitored objects and unique identifiers of the multiple monitored objects.

9. The physical machine according to claim 8, wherein in the determining respective service statuses of the multiple monitored objects according to the monitoring information of the multiple monitored objects and the unique identifiers of the multiple monitored objects, the primary monitor is configured to determine, according to a correspondence between data zones in which the monitoring information of the multiple monitored objects is located and the unique identifiers of the multiple monitored objects, the respective service statuses of the multiple monitored objects reporting the monitoring information, wherein the data zones are data zones of the multiple monitored objects reporting the monitoring information, and the data zones comprise at least one of a heap type or a stack type.

10. The physical machine according to claim 8, wherein the same channel is a communication connection between files or processes.

11. The physical machine according to claim 10, wherein the same channel is a Proc file system, and in the aspect of obtaining monitoring information respectively reported by the multiple monitored objects, the primary monitor is configured to receive the respective monitoring information that is reported by the multiple monitored objects by using one or more files in the Proc file system, wherein monitored objects of a same type in the multiple monitored objects share a same file in the Proc file system for reporting the monitoring information.

12. The physical machine according to claim 10, wherein the same channel is a device file, and in the obtaining monitoring information respectively reported by the multiple monitored objects, the primary monitor is configured to receive the respective monitoring information that is reported by the multiple monitored objects by using one or more device files, wherein monitored objects of a same type in the multiple monitored objects share a same device file for reporting the monitoring information.

13. The physical machine according to claim 10, wherein the same channel is a socket communication connection, and in the obtaining monitoring information respectively reported by the multiple monitored objects, the primary monitor is configured to receive the respective monitoring information that is reported by the multiple monitored objects by using one or more socket communication connections, wherein monitored objects of a same type in the multiple monitored objects share a same socket communication connection address for reporting the monitoring information.

14. The physical machine according to claim 10, wherein the same channel is an inter-process communication IPC channel, the multiple monitored objects comprise at least one of a thread type or a process type, a container in which each of the multiple monitored objects is located comprises a monitoring thread, and in the obtaining monitoring information respectively reported by the multiple monitored objects, the primary monitor is configured to receive the monitoring information that is reported by the multiple monitored objects by using respective corresponding monitoring threads, wherein monitored objects of a same type in the multiple monitored objects share a same IPC channel for communication with the primary monitor to report the monitoring information.

15. A computer-readable storage medium comprising instructions which, when executed by a computer, cause the computer to carry out a container monitoring method, which is used to monitor multiple monitored objects running on a physical machine, wherein the multiple monitored objects comprise at least one of a container type, a process-in-container type, or a thread-in-container type, the physical machine comprises a primary monitor, and the monitoring method comprises:

obtaining, by the primary monitor, monitoring information respectively reported by the multiple monitored objects, wherein monitoring information of monitored objects of a same type in the multiple monitored objects is reported by using a same channel, each of the multiple monitored objects has a unique identifier, the monitoring information of each monitored object comprises at least one of heartbeat information or a quality of service report, the heartbeat information indicates a running status in a heartbeat period, of the monitored object reporting the heartbeat information, and the quality of service report is used to record quality of service (QoS) of an application carried on the monitored object reporting the quality of service report; and determining, by the primary monitor, respective service statuses of the multiple monitored objects according to the monitoring information of the multiple monitored objects and unique identifiers of the multiple monitored objects.

16. The computer-readable storage medium according to claim 15, wherein the determining, by the primary monitor, respective service statuses of the multiple monitored objects according to the monitoring information of the multiple monitored objects and the unique identifiers of the multiple monitored objects comprises:

determining, by the primary monitor according to a correspondence between data zones in which the monitoring information of the multiple monitored objects is located and the unique identifiers of the multiple monitored objects, the respective service statuses of the multiple monitored objects reporting the monitoring information, wherein the data zones are data zones of the multiple monitored objects reporting the monitoring information, and the data zones comprise at least one of a heap type or a stack type.

17. The computer-readable storage medium according to claim 15, wherein the same channel is a communication connection between files or processes.

18. The computer-readable storage medium according to claim 17, wherein the same channel is a Proc file system, and the obtaining, by the primary monitor, monitoring information respectively reported by the multiple monitored objects comprises:

receiving, by the primary monitor, the respective monitoring information that is reported by the multiple monitored objects by using one or more files in the Proc file system, wherein monitored objects of a same type in the multiple monitored objects share a same file in the Proc file system for reporting the monitoring information.

19. The computer-readable storage medium according to claim 17, wherein the same channel is a device file, and the obtaining, by the primary monitor, monitoring information respectively reported by the multiple monitored objects comprises:

obtaining, by the primary monitor, the respective monitoring information that is reported by the multiple monitored objects by using one or more device files, wherein monitored objects of a same type in the multiple monitored objects share a same device file for reporting the monitoring information.

20. The computer-readable storage medium according to claim 17, wherein the same channel is a socket communication connection, and the obtaining, by the primary monitor, monitoring information respectively reported by the multiple monitored objects comprises:

obtaining, by the primary monitor, the respective monitoring information that is reported by the multiple monitored objects by using one or more socket communication connections, wherein monitored objects of a same type in the multiple monitored objects share a same socket communication connection address for reporting the monitoring information.

21. The computer-readable storage medium according to claim 17, wherein the same channel is an inter-process communication IPC channel, the multiple monitored objects comprise at least one of a thread type or a process type, a container in which each of the multiple monitored objects is located comprises a monitoring thread, and the obtaining, by the primary monitor, monitoring information respectively reported by the multiple monitored objects comprises:

obtaining, by the primary monitor, the monitoring information that is reported by the multiple monitored objects by using respective corresponding monitoring threads, wherein monitored objects of a same type in the multiple monitored objects share a same IPC channel for communication with the primary monitor to report the monitoring information.

\* \* \* \* \*